US012646777B2

(12) United States Patent
Jeon et al.

(10) Patent No.: US 12,646,777 B2
(45) Date of Patent: Jun. 2, 2026

(54) BATTERY CELL BUNDLE AND BATTERY CELL ASSEMBLY INCLUDING THE SAME

(71) Applicant: SK ON CO., LTD., Seoul (KR)

(72) Inventors: Hae Ryong Jeon, Daejeon (KR); Ji Eun Kang, Daejeon (KR); Yang Kyu Choi, Daejeon (KR)

(73) Assignee: SK ON CO., LTD., Seoul (KR)

( * ) Notice: Subject to any disclaimer, the term of this patent is extended or adjusted under 35 U.S.C. 154(b) by 739 days.

(21) Appl. No.: 17/945,818

(22) Filed: Sep. 15, 2022

(65) Prior Publication Data

US 2023/0080035 A1     Mar. 16, 2023

(30) Foreign Application Priority Data

Sep. 15, 2021     (KR) ........................ 10-2021-0123340

(51) Int. Cl.
| | |
|---|---|
| *H01M 50/211* | (2021.01) |
| *H01M 10/48* | (2006.01) |
| *H01M 50/262* | (2021.01) |
| *H01M 50/271* | (2021.01) |
| *H01M 50/507* | (2021.01) |

(52) U.S. Cl.
CPC ....... *H01M 50/211* (2021.01); *H01M 10/482* (2013.01); *H01M 50/262* (2021.01); *H01M 50/271* (2021.01); *H01M 50/507* (2021.01)

(58) Field of Classification Search
CPC ............. H01M 10/613; H01M 50/211; H01M 50/262; H01M 50/507; H01M 50/271; H01M 10/482
See application file for complete search history.

(56) References Cited

U.S. PATENT DOCUMENTS

| | | |
|---|---|---|
| 10,777,791 B1 | 9/2020 | Wang et al. |
| 10,790,544 B1 | 9/2020 | Wang et al. |
| 11,063,316 B2 | 7/2021 | Kim et al. |
| 11,870,094 B2 | 1/2024 | Shin et al. |
| 2014/0023887 A1 | 1/2014 | Lim |
| 2015/0228945 A1 | 8/2015 | Maruoka |

(Continued)

FOREIGN PATENT DOCUMENTS

| | | | | |
|---|---|---|---|---|
| CN | 113036265 A | 6/2021 | | |
| DE | 102017200993 A1 * | 7/2018 | .............. | H01M 2/26 |

(Continued)

OTHER PUBLICATIONS

Enning et al., DE102017200993A1 EPO machine translation, 2018 (Year: 2018).*

(Continued)

*Primary Examiner* — Jonathan G Leong
*Assistant Examiner* — Kan Luo
(74) *Attorney, Agent, or Firm* — Perkins Coie LLP

(57) ABSTRACT

A battery cell bundle comprises a support member including a barrier wall including first and second sides extending from an end of the support member; a plurality of first battery cells disposed on the first side of the barrier wall and a plurality of second battery cells disposed on the second side of the barrier wall; and an internal busbar to electrically connect the plurality of battery cells to each other, wherein the internal busbar includes a first busbar to electrically connect the plurality of first battery cells to each other, and a second busbar to electrically connect the plurality of second battery cells to each other, and wherein a portion of the first busbar is electrically connected to a portion of the second busbar.

19 Claims, 31 Drawing Sheets

(56) References Cited

U.S. PATENT DOCUMENTS

| | | |
|---|---|---|
| 2016/0093857 A1 | 3/2016 | DeKeuster et al. |
| 2016/0268658 A1 | 9/2016 | Kong et al. |
| 2017/0294634 A1 | 10/2017 | Choi |
| 2018/0048033 A1 | 2/2018 | Lee et al. |
| 2018/0183119 A1 | 6/2018 | Ju et al. |
| 2018/0254444 A1 | 9/2018 | Yoon et al. |
| 2018/0287109 A1* | 10/2018 | Nakamoto et al. ..... H01M 2/10 |
| 2019/0181405 A1 | 6/2019 | Kim et al. |
| 2020/0212404 A1 | 7/2020 | Omura et al. |
| 2020/0358063 A1 | 11/2020 | Tada et al. |
| 2020/0365956 A1 | 11/2020 | Jeon et al. |
| 2020/0411816 A1 | 12/2020 | Yoneyama |
| 2021/0104793 A1* | 4/2021 | Parkanzky et al. .......................... H01M 10/6569 |
| 2021/0249733 A1 | 8/2021 | Kim et al. |
| 2021/0257696 A1 | 8/2021 | Mochizuki et al. |
| 2021/0320374 A1 | 10/2021 | Lee et al. |
| 2021/0391609 A1 | 12/2021 | Jeon et al. |
| 2022/0115737 A1 | 4/2022 | Shin et al. |
| 2022/0123423 A1 | 4/2022 | Wang et al. |
| 2022/0271388 A1 | 8/2022 | Choi et al. |
| 2023/0070149 A1* | 3/2023 | Park ................... H01M 50/178 |

FOREIGN PATENT DOCUMENTS

| | | | |
|---|---|---|---|
| KR | 10-2009-0002428 A | 1/2009 | |
| KR | 10-2012-0108677 A | 10/2012 | |
| KR | 10-2016-0053762 A | 5/2016 | |
| KR | 10-2017-0047687 A | 5/2017 | |
| KR | 10-2018-0125796 A | 11/2018 | |
| KR | 10-2019-0069873 A | 6/2019 | |
| KR | 10-2020-0107213 A | 9/2020 | |
| KR | 10-2020-0131499 A | 11/2020 | |
| KR | 10-2020-0131501 A | 11/2020 | |
| KR | 10-2021-0004189 A | 1/2021 | |
| KR | 10-2021-0077416 A | 6/2021 | |
| WO | 2021002626 A1 | 1/2021 | |

OTHER PUBLICATIONS

Office Action for Korean Patent Application No. KR 10-2021-0123340, mailed Dec. 12, 2025, 18 pages.

Office Action for U.S. Appl. No. 17/945,797, mailed Jan. 9, 2026, 37 pages.

Notice of Allowance for Korean Patent Application No. 10-2021-0123341, mailed Apr. 23, 2026 (2 pages).

* cited by examiner

III-III'

IV-IV'

IV-IV'

V-V'

VI-VI'

D

VII–VII'

VIII-VIII'

BATTERY CELL BUNDLE AND BATTERY CELL ASSEMBLY INCLUDING THE SAME

CROSS-REFERENCE TO RELATED APPLICATIONS

This patent document claims the priority and benefits of Korean Patent Application No. 10-2021-0123340 filed in the Korean Intellectual Property Office on Sep. 15, 2021, the disclosure of which is incorporated herein by reference in its entirety.

TECHNICAL FIELD

This patent document relates to a battery cell bundle including a plurality of battery cells, and a battery cell assembly including the same.

BACKGROUND

Unlike primary batteries, secondary batteries may be used, discharged, and then recharged to their original condition, and thus the demand for secondary batteries is increasing in various devices such as digital cameras, mobile phones, notebook computers, hybrid vehicles, and electric vehicles. Examples of such secondary batteries may include nickel-cadmium batteries, nickel-metal hydride batteries, nickel-hydrogen batteries, and lithium secondary batteries.

Lithium secondary batteries, among others, have been widely studied because of their high energy density and discharge. Recently, lithium secondary batteries including pouch-type battery cell having flexibility or can-type battery cell having a prismatic or cylindrical shape having rigidity have become the most promising lithium secondary batteries. A secondary battery may include a plurality of battery cells electrically connected to each other and stacked on top of one another to form a cell stack. The cell stack may be disposed in a module housing, forming a battery module. A plurality of battery modules may be installed in a pack housing to form a battery pack. Recently, in order to increase energy density of a battery pack, a cell-to-pack structure which includes a cell stack may be directly installed on the pack housing without a module housing to form a battery pack is being used.

SUMMARY

The disclosed technology can be implemented in some embodiments to provide a battery cell bundle having a simplified series and parallel connection structure between battery cells and electrical connectivity between the battery cells may be easily performed, and a battery cell assembly including the same.

In some implementations of the disclosed technology, provided are a battery cell bundle which may provide a simplified and stable fixing structure of an internal busbar, and a battery cell assembly including the same.

In some implementations of the disclosed technology, provided are a battery cell bundle which may delay or reduce thermal runaway, and a battery cell assembly including the same.

In some implementations of the disclosed technology, provided are a battery cell bundle which may allow gas generated by a battery cell accommodated in an internal space to be discharged in a specific direction or position, and a battery cell assembly including the same.

In some implementations of the disclosed technology, provided are a battery cell bundle which may be easily manufactured, and a battery cell assembly including the same.

In some implementations of the disclosed technology, provided are a battery module which may delay or reduce thermal runaway, and a battery pack including the same.

In some implementations of the disclosed technology, provided are a battery module which may allow gas generated by a battery cell to be swiftly discharged in a specific direction or position, and a battery pack including the same.

In some implementations of the disclosed technology, provided are a battery module which may increase cooling efficiency, and a battery pack including the same.

In some implementations of the disclosed technology, a battery cell bundle includes a support member including a barrier wall including first and second sides extending from an end of the support member; a plurality of first battery cells disposed along the support member on the first side of the barrier wall and a plurality of second battery cells disposed along the support member on the second side of the barrier wall; and an internal busbar to electrically connect the plurality of battery cells to each other, wherein the internal busbar includes a first busbar to electrically connect the plurality of first battery cells disposed on the first side of the barrier wall to each other, and a second busbar to electrically connect the plurality of second battery cells disposed on the second side of the barrier wall to each other, and wherein a portion of the first busbar is electrically connected to a portion of the second busbar.

The portion of the first busbar may be electrically connected to the portion of the second busbar through a conductive material layer formed by penetrating through the barrier wall.

The first busbar may be fixed to and installed on the first side of the barrier wall, and the second busbar may be fixed to and installed on the second side of the barrier wall. The first busbar and the second busbar may be fastened to the barrier wall by a fastening portion, and the fastening portion may fasten the first busbar and the second busbar together.

The first busbar may include a first insulating body formed of an insulating material, and a first conductive member supported by the first insulating body and formed of an electrically conductive material for electrically connecting the plurality of battery cells to each other, the second busbar may include a second insulating body formed of an insulating material, and a second conductive member supported by the second insulating body and formed of an electrically conductive material for electrically connecting the plurality of battery cells to each other, and the barrier wall may include an opening to connect the first conductive member to the second conductive member through the opening. Each of the first conductive member and the second conductive member may include a first conductive portion connected to one battery cell and a second conductive portion connected to another battery cell, respectively, and the first conductive portion may be insulated from the barrier wall by the first insulating body or the second insulating body.

The second conductive portions may be connected to a different second conductive portion through the opening.

The battery cell bundle may further include a sensing unit configured to measure an electrical state of the battery cell, wherein the sensing unit may include a voltage sensing terminal connected to at least one of the first conductive member and the second conductive member, and a circuit member configured to transmit a signal from the voltage sensing terminal.

The battery cell may be a pouch-type secondary battery that includes an electrode lead exposed externally of the sealing portion. A distance between the barrier wall and the electrode lead may have a value of 0.95 to 1.05 times a distance between the barrier wall and a portion of the sealing portion from which the electrode lead is exposed. A portion of the electrode lead in contact with the internal busbar may be disposed on the same plane on which the sealing portion is disposed. The electrode lead and the internal busbar may be in surface-contact with each other and may be electrically connected to each other.

The battery cell bundle may further include a cover member surrounding at least a portion of an external surface of the plurality of first and second battery cells, and coupled to the support member such that the cover member and the support member define an internal space for accommodating the plurality of first and second battery cells; and a panel member covering ends of the internal space, wherein the internal space may be divided into a plurality of installation spaces by the barrier wall, and wherein the plurality of first and second battery cells may be disposed in each of the installation spaces in the length direction of the barrier wall.

The support member may further include an external side wall extending from at least one end of the barrier wall in a thickness direction of the battery cell.

In some implementations of the disclosed technology, a battery cell assembly includes a plurality of battery cell bundles to accommodate a plurality of battery cells there in the plurality of battery cell bundles; and a heat or flame spread blocking member disposed between at least a portion of adjacent battery cell bundles to block heat or flames generated in one of the battery cell bundles from spreading to an adjacent battery cell bundles, wherein each of the battery cell bundles includes a support member including a barrier wall including first and second sides extending from an end of the support member; a plurality of first battery cells disposed along the support member on the first side of the barrier wall and a plurality of second battery cells disposed along the support member on the second side of the barrier wall; and an internal busbar to electrically connect the plurality of the battery cells to each other, wherein the internal busbar includes a first busbar to electrically connect the plurality of first battery cells disposed on the first side of the barrier wall to each other, and a second busbar to electrically connect the plurality of second battery cells disposed on the second side of the barrier wall to each other, and wherein a portion of the first busbar is electrically connected to a portion of the second busbar through the barrier wall.

BRIEF DESCRIPTION OF DRAWINGS

The above and other aspects, features, and advantages of the disclosed technology will be more clearly understood from the following detailed description, taken in conjunction with the accompanying drawings, in which.

DETAILED DESCRIPTION

Some events can cause leakage of electrolyte gas out of a battery cell. For example, when the lifespan of a battery cell is almost over, when a battery cell swells up, when a battery cell is overly charged, when a battery cell is exposed to heat, when a sharp object such as a nail penetrates through a casing of a battery cell, or when an external force impacts a battery cell, an electrolyte gas may leak out of a battery cell. Particularly, in the case of a pouch-type battery cell, when the above events occur, a large amount of electrolyte gas may be exposed through a sealing portion of a pouch (an exterior material).

When a battery cell is overheated or ignited in a battery cell, a thermal runaway can occur, causing high-temperature electrolyte gas, flames, and/or combustion materials to be ejected out of the battery cell. As a result, heat and/or flames may spread to neighboring battery cells. In order to delay or reduce this thermal runaway phenomenon, it may be necessary to swiftly discharge gas (e.g., electrolyte gas, flames, and combustion materials) generated in the battery pack or battery module from the battery pack and/or battery module.

In order to increase a length of a cell stack, a plurality of battery cells may form a cell stack as a unit of battery cells by connecting the plurality of battery cells to each other in a length direction of the battery cells.

However, in some cases, when a plurality of battery cells included in the unit is exposed, gas generated by the battery cells may be discharged in an arbitrary direction, such that it may be difficult to effectively address the thermal runaway issues. In addition, when the battery cells included in each unit are exposed, heat and/or flames may easily spread to battery cells included in neighboring units.

Furthermore, in some cases, when the gas discharged from battery cells included in the unit is not stably guided in a specific direction or to a specific position, it may be difficult to effectively address the thermal runaway issues. As such, the gas generated by the battery cells included in the unit may not be rapidly discharged from a pack housing or a module housing, thereby negatively affecting a battery pack or a battery module.

In some cases where the unit is formed by connecting the battery cells in the length direction, it may be difficult to electrically connect structures between the battery cells when the battery cells are electrically connected in the length direction.

The disclosed technology can be implemented in some embodiments to provide a battery cell bundle 100 as shown in FIGS. 1 to 12.

Figure 1:
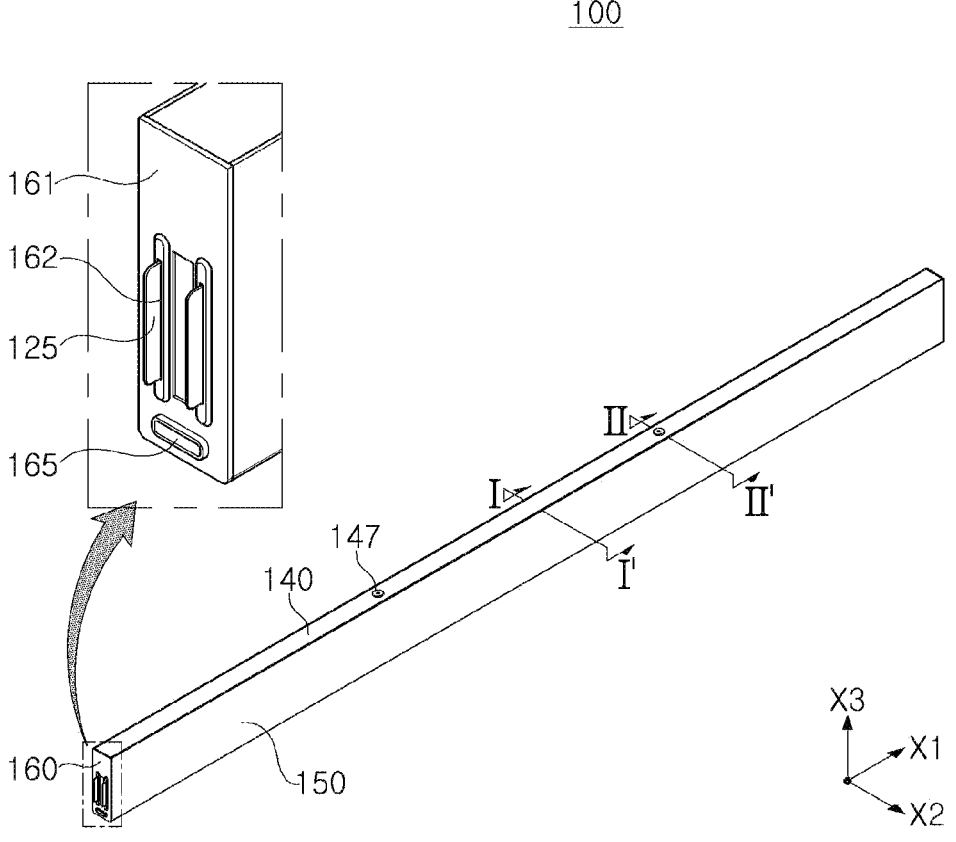
FIG. 1 is a perspective diagram illustrating a battery cell bundle according to an example embodiment of the disclosed technology.
Figure 2:
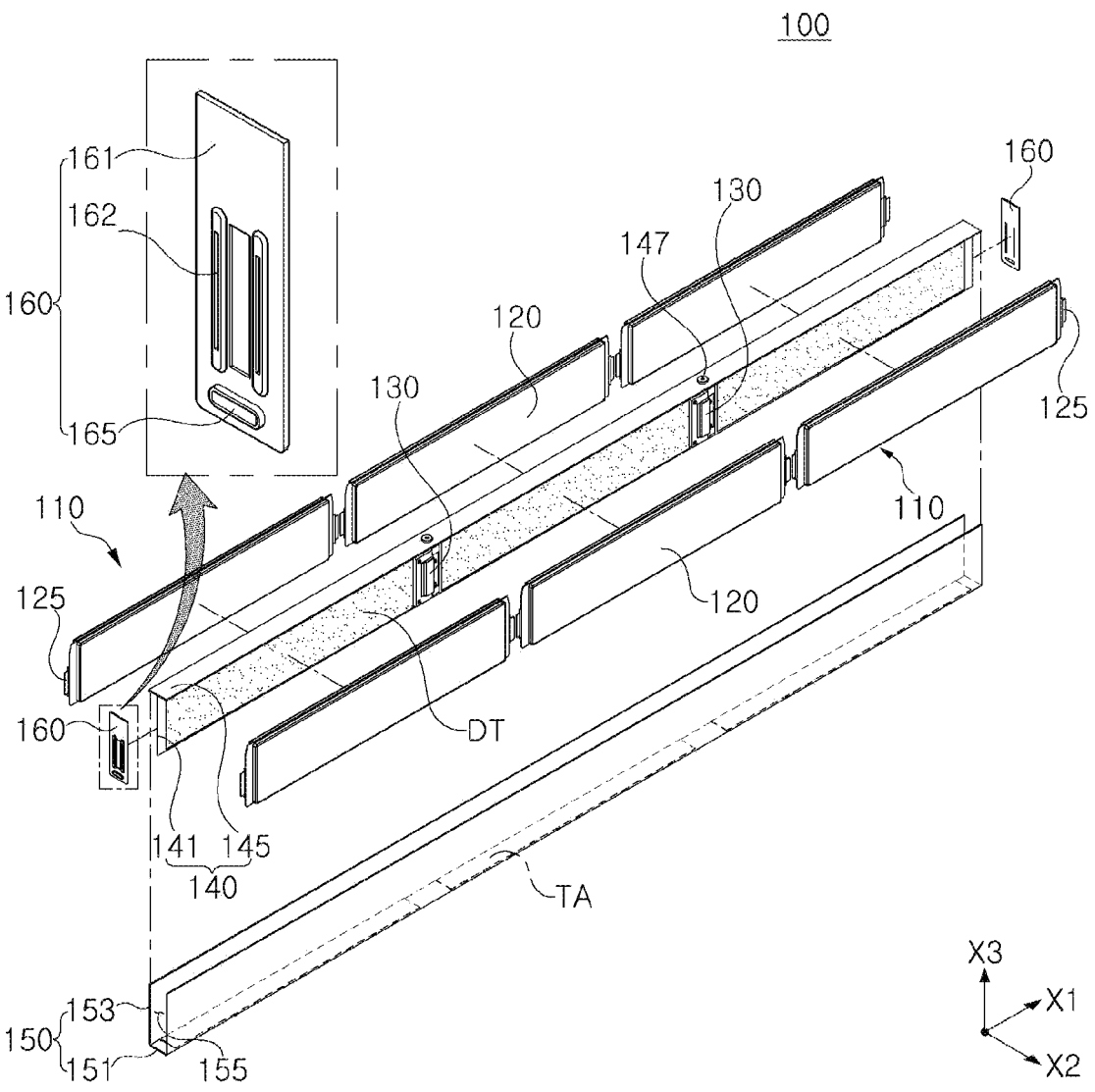
FIG. 2 is an exploded perspective diagram illustrating a battery cell bundle according to an example embodiment of the disclosed technology.

FIG. 1 is a perspective diagram illustrating a battery cell bundle 100 according to an example embodiment, and FIG. 2 is an exploded perspective diagram illustrating a battery cell bundle 100 according to an example embodiment.

Referring to FIGS. 1 and 2, the battery cell bundle 100 according to an example embodiment may include a support member 140 and a plurality of battery cells 120 installed on the support member 140.

The support member 140 may include a structure that supports the battery cell 120. The support member 140 may include an external side wall 145 and at least one barrier wall 141 extending in one direction from the external side wall

145. The at least one barrier wall 141 may include first and second sides extending from an end (the external side wall) of the support member. When one barrier wall 141 extends from the external side wall 145, the support member 140 may have a T-shaped cross-section. However, in an example embodiment, the number of the barrier walls 141 is not limited to one, and the external side walls 145 may be disposed on both sides of the barrier wall 141.

The battery cells 120 may be installed on both sides of the barrier wall 141, respectively. In this case, a plurality of battery cells 120 may be installed on one side and the other side of the barrier wall 141, respectively. The battery cells 120 includes a plurality of first battery cells disposed along the support member 140 on the first side of the at least one barrier wall 141 and a plurality of second battery cells disposed along the support member 140 on the second side of the at least one barrier wall 141. The plurality of battery cells 120 may be electrically connected to each other on one side and the other side of the barrier wall 141 in the length direction of the barrier wall 141.

To fix the battery cell 120 to the barrier wall 141 of the support member 140, the barrier wall 141 may be provided with a bonding means DT, such as double-sided tape. The plurality of battery cells 120 installed on each of both sides of the barrier wall 141 may form the cell unit 110.

The battery cell 120 may be configured as a rechargeable secondary battery, such as a lithium secondary battery. In an example embodiment, the battery cell 120 may be configured as a pouch-type secondary battery. The battery cell 120 may have a shape in which electrode leads 125 are disposed on both sides in the length direction.

The battery cell bundle 100 according to an example embodiment may include an internal busbar 130 electrically connecting the plurality of battery cells 120 to each other. The internal busbar 130 may electrically connect the plurality of battery cells 120 disposed on one side and the other side of the barrier wall 141 in the length direction of the barrier wall 141 to each other. Also, the internal busbar 130 may electrically connect the battery cells 120 installed on one side and the other side of the barrier wall 141 to each other. That is, the internal busbar 130 may connect the plurality of battery cells 120 to each other in series and/or in parallel. For electrical connectivity between the battery cell 120 and the internal busbar 130, the electrode lead 125 of the battery cell 120 may be bonded to the internal busbar 130 by welding. The internal busbar 130 may be attached to the support member 140 through a generally used bonding means such as screws, bolts, and an adhesive. At least a portion of the internal busbar 130 may be formed of an electrically conductive material for electrical connection with the battery cell 120.

The battery cell bundle 100 according to an example embodiment may include a cover member 150 coupled to the support member 140 and forming or defining an internal space S (in FIG. 6) together with the support member 140. The internal space of the cover member 150 may have a hollow shape having an angular cross-section, but the shape of the cross-section is not limited thereto, and the hollow shape may have a circular cross-section. The cover member 150 may have a tube, a rectangular tube, a mono frame, or a hexahedral shape of which at least one end is open. The cover member 150 may be bonded to the external side wall 145 of the support member 140 by welding. Also, the cover member 150 may also be bonded to the panel member 160.

Also, the cover member 150 may have a structure surrounding at least a portion of an external circumferential surface of the battery cell 120. The cover member 150 may surround at least a portion of an outer portion of the plurality of first and second battery cells 120. For example, the cover member 150 may have a U-shaped cross-section to cover a side surface and a lower surface of the battery cell 120. In this case, the cover member 150 may include a bottom portion 151 covering the lower surface of the battery cell 120, and a side portion 153 having a shape extending from both ends of the bottom portion 151 and covering a wide surface (a side surface) of the battery cell 120. The bottom portion 151 and the side portion 153 may form an accommodation space 155 for accommodating the support member 140 on which the battery cell 120 is mounted. A heat transfer member TA including a heat conductive adhesive may be installed on the bottom portion 151 of the cover member 150.

The battery cell bundle 100 according to an example embodiment may include a panel member 160 covering an open end of the tube-shaped internal space S (in FIG. 6) formed (defined) by the support member 140 and the cover member 150. In an example embodiment, the panel member 160 may be installed on both sides of the support member 140 in the length direction X1, respectively.

The panel member 160 may include a plate-shaped panel body 161, and the panel body 161 may have a through-hole 162 through which the electrode lead 125 penetrates. Accordingly, the electrode lead 125 of the battery cell 120 disposed on an outer portion among the battery cells 120 installed on the support member 140 may be exposed through the through-hole 162. The through-holes 162 may have the number and shape corresponding to the through-holes 162 may correspond to the electrode leads 125 of the battery cell 120 disposed on the outer portion among the battery cells 120 installed on the support member 140.

The support member 140 may include a first venting member 147 for discharging gas generated in the battery cell bundle 100. The first venting member 147 may be disposed in a position corresponding to the position between the plurality of battery cells 120 disposed in the installation space S1 and S2 (in FIG. 5). As an example, the first venting member 147 may be disposed on the external side wall 145 in a position corresponding to the space (position) between the battery cells 120 disposed in the length direction X1 of the barrier wall 141. That is, the first venting member 147 may be disposed in a position of the external side wall 145 corresponding to the position of the internal busbar 130.

Also, the panel member 160 may include a second venting member 165 for discharging the gas generated in the battery cell bundle 100.

Figures 3, 4:
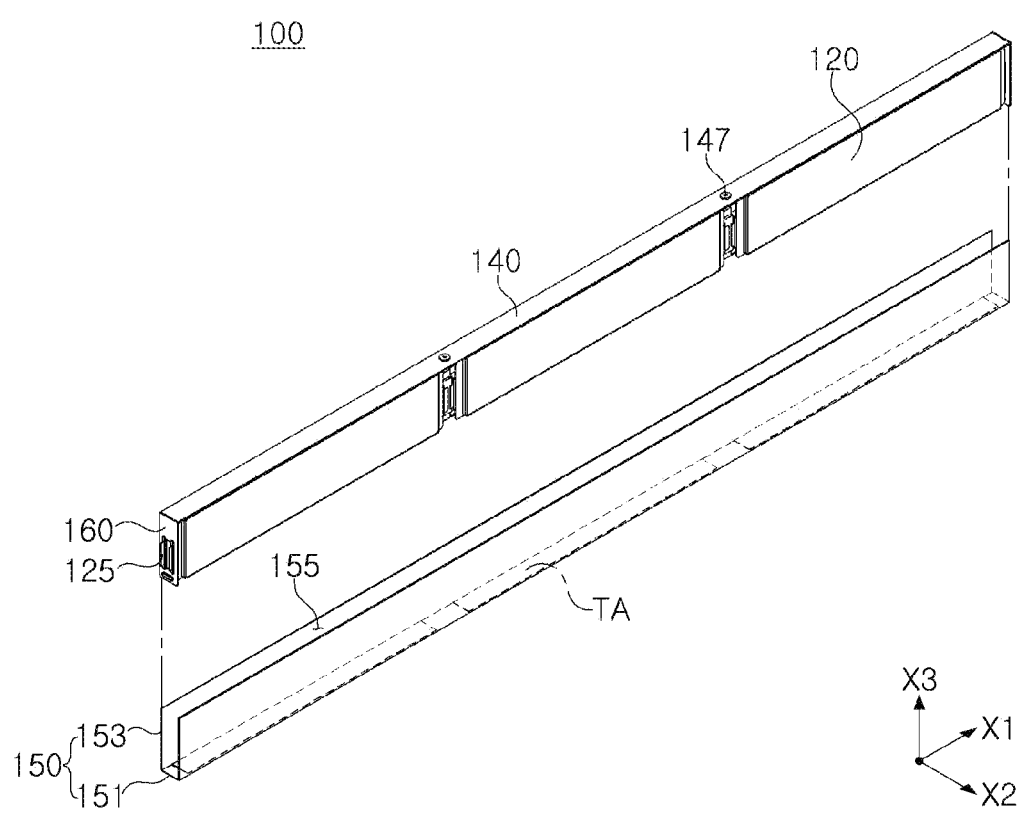
FIG. 3 is a perspective diagram illustrating a state in which a cover member is coupled in the battery cell bundle illustrated in FIG. 1.
FIG. 4 is a perspective diagram illustrating a battery cell according to an example embodiment of the disclosed technology.

FIG. 3 is a perspective diagram illustrating a state in which a cover member 150 is coupled in the battery cell bundle 100 illustrated in FIG. 1.

Referring to FIG. 3, when the battery cell 120 disposed on an outer region of the support member 140 and the panel member 160 are combined, the electrode lead 125 may be exposed externally of the panel member 160. The assembly in which the battery cell 120 and the panel member 160 are coupled to the support member 140 may be accommodated in the accommodating space 155 of the cover member 150. In this case, to increase heat transfer efficiency between the lower surface of the battery cell 120 and the cover member 150, a heat transfer member TA including a thermally conductive adhesive may be installed on the bottom portion 151 of the cover member 150.

FIG. 4 is a perspective diagram illustrating a battery cell 120 according to an example embodiment.

In an example embodiment, the battery cell 120 may be configured as a pouch-type secondary battery, and may have a structure in which the electrode lead 125 protrudes externally.

The battery cell 120 may have a form in which the electrode assembly 127 is accommodated in the pouch 121 forming a casing. The electrode assembly 127 may include a plurality of electrode plates (not illustrated) and may be accommodated in the pouch 121. Here, the electrode plate may include a positive plate and a negative plate, and the electrode assembly 127 may have a form in which the positive and negative plates are stacked in the thickness direction X2 with a separator interposed therebetween with the wide surfaces of the positive and negative plates opposing each other. An electrode tab (not illustrated) may be disposed on each of the plurality of positive plates and the plurality of negative plates, and the electrode tabs having the same polarity may be in contact with each other and may be electrically connected to the electrode leads 125 of the same polarity.

The pouch 121 may be formed in the form of a container and may provide an internal space in which the electrode assembly 127 and the electrolyte (not illustrated) are accommodated. In this case, a portion of the electrode lead 125 may be exposed externally of the pouch 121.

The pouch 121 may be divided into an electrode accommodation portion 122 and a sealing portion 123. The electrode accommodation portion 122 may be formed in a container shape and may provide a space in which the electrode assembly 127 and the electrolyte are accommodated.

A portion of the pouch 121 may be bonded to the sealing portion 123 and the sealing portion 123 may seal a circumference of the accommodation portion 122. The sealing portion 123 may be formed in the form of a flange extending outwardly from the accommodation portion 122 formed in the shape of a container, and may be disposed along a periphery of the accommodation portion 122. A heat sealing method may be used for bonding the pouch 121 to form the sealing portion 123, but an example embodiment thereof is not limited thereto. Also, in an example embodiment, the sealing portion 123 may be divided into a first sealing portion 123a in which the electrode lead 125 is disposed, and a second sealing portion 123b in which the electrode lead 125 is not disposed.

The first sealing portion 123a may include an insulating film between the pouch 121 and the electrode lead 125 to increase a degree of sealing in the position in which the electrode lead 125 is drawn out and also to secure an insulating state. The insulating portion 126 may have a shape in which a portion thereof is exposed externally of the pouch 121.

In an example embodiment, the pouch 121 may be formed by forming a sheet of exterior material. More specifically, after forming one or two accommodation portions in one sheet of exterior material, and the pouch 121 may be completed by folding the exterior material such that the accommodation portions may form one space (the accommodation portion 122).

In an example embodiment, the accommodation portion 122 may be formed in a quadrangular shape. Also, a sealing portion 123 formed by bonding an exterior material may be disposed on the external side of the accommodation portion 122. However, it may not be necessary to form the sealing portion 123 on the surface on which the exterior material is folded. Therefore, in an example embodiment, the sealing portion 123 may be formed on an outer region of the accommodation portion 122, and may be disposed only on three surfaces of the accommodation portion 122, and the sealing portion 123 may not be disposed one surface (a lower surface in FIG. 4) of the outer region of the accommodation portion 122.

In an example embodiment, the electrode leads 125 may be disposed to be directed in opposite directions on both sides of the length direction X1 of the battery cell 120. An electrode lead 125 of a first polarity (e.g., a positive electrode) may be disposed on one side of the battery cell 120 in the length direction, and an electrode lead 125 of a second polarity (e.g., a negative electrode) may be disposed on the other side of the battery cell 120 in the length direction. The two electrode leads 125 may be disposed on the sealing portions 123 formed on different sides. Accordingly, the sealing portion 123 implemented based on an example embodiment may include two first sealing portions 123a in which the electrode leads 125 are disposed, and one second sealing portion 123b in which the electrode lead 125 is not disposed. The second sealing portion 123b may be formed on the upper surface of the pouch 121 in FIG. 4, but the second sealing portion 123b may be formed on the lower surface of the pouch 121.

The pouch 121 used in an example embodiment is not limited to a structure in which the sealing portion 123 is formed on three surfaces by folding a sheet of exterior material as illustrated in FIG. 4. For example, the accommodation portion 122 may be formed by overlapping two sheets of exterior material, and the sealing portion 123 may be formed on all of four surfaces around the accommodation portion 122.

Also, in the battery cell 120 implemented based on an example embodiment, to increase bonding reliability of the sealing portion 123 and to reduce the area of the sealing portion 123, the sealing portion 123 may be folded at least once. More specifically, the second sealing portion 123b in which the electrode lead 125 is not disposed among the sealing portions 123 based on an example embodiment may be folded twice and may be fixed by the adhesive member 124. For example, the second sealing portion 123b may be folded by 180° along a first bending line C1 and may be folded along a second bending line C2 illustrated in FIG. 4. In this case, the second sealing portion 123b may be filled with an adhesive member 124, and the shape of the second sealing portion 123b folded twice may be maintained by the adhesive member 124. The adhesive member 124 may be formed of an adhesive having high thermal conductivity. For example, the adhesive member 124 may be formed of epoxy or silicone, but an example embodiment thereof is not limited thereto.

The battery cell 120 may be a nickel metal hydride (Ni-MH) battery or a lithium ion (Li-ion) battery which may be charged and discharged.

Figure 5:
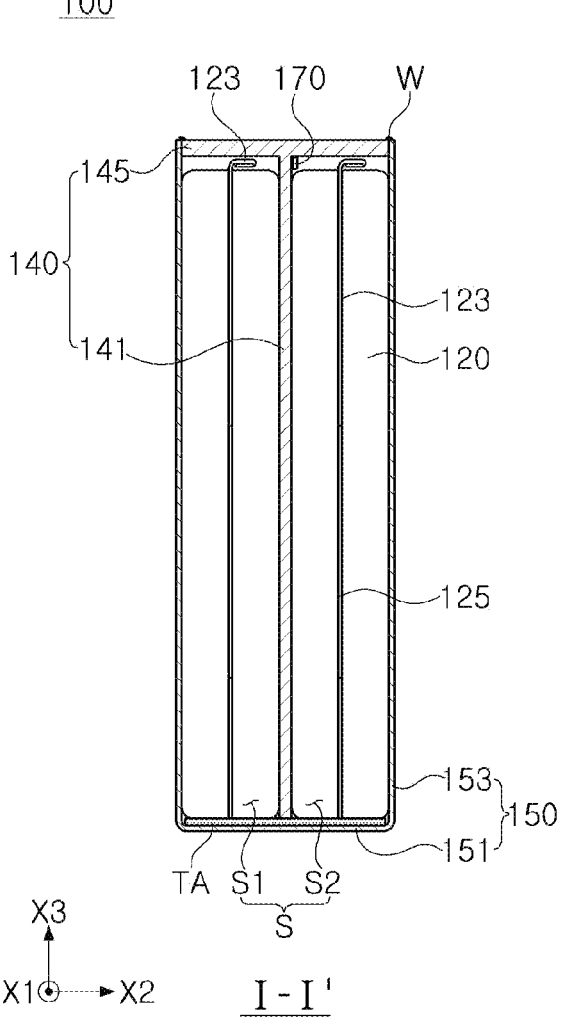
FIG. 5 is a cross-sectional diagram taken along line I-I' in FIG. 1.

FIG. 5 is a cross-sectional diagram taken along line I-I' in FIG. 1. For the convenience of explanation, the battery cell has an external shape.

Referring to FIG. 5, a battery cell bundle 100 according to an example embodiment may include a support member 140 on which the battery cell 120 is installed and a covering member 150 covering at least a portion of an external circumferential surface of the battery cell 120.

The support member 140 may include a barrier wall 141 disposed between the battery cells 120 and an external side wall 145 extending from at least one end of the barrier wall 141 in the thickness direction of the battery cell 120. The support member 140 may have a T-shaped cross-section by the external side wall 145 and the barrier wall 141, and may function as a structure supporting the battery cell 120.

The support member 140 may be formed of a highly conductive metal material such as aluminum or SUS to easily transfer heat generated in the battery cell 120 externally. Particularly, since the barrier wall 141 is in contact with the side surface of the battery cell 120 on the wide surface, the barrier wall 141 may perform a heat dissipation function of transferring heat generated in the battery cell 120 externally.

The support member 140 may need to have rigidity to support the battery cell 120, and accordingly, the support member 140 may have a thickness greater than that of the cover member 150.

Also, since the external side wall 145 of the support member 140 may be welded and bonded to the cover member 150, the thickness of the external side wall 145 may be equal to or greater than the thickness of the barrier wall 141 to easily perform welding. As an example, the thickness of the external side wall 145 may be 1.2 mm, and the thickness of the barrier wall 141 may be 0.8 mm. The support member 140 may be manufactured by an extrusion process. When the thickness of the external side wall 145 is equal to or greater than that of the barrier wall 141, the extrusion process may be easily performed.

The battery cells 120 may be disposed on both sides of the barrier wall 141, respectively, and the wide side of the battery cell 120 may be attached to the barrier wall 141 through bonding means DT (in FIG. 2) such as double-sided tape. The battery cells 120 may be disposed on both sides of the barrier wall 141 in a state in which the sealing portion 123 is disposed on the upper portion and the unsealed portion is disposed on the lower portion.

The cover member 150 may include a bottom portion 151 corresponding to the lower surface of the battery cell 120 and a side portion 153 corresponding to the wide surface of the battery cell 120, and may have a U-shaped cross-section. That is, the cover member 150 may have a shape surrounding the wide surface and the lower surface of the battery cell 120.

The cover member 150 may be formed of a highly conductive metal material such as aluminum or SUS to easily transfer the heat generated in the battery cell 120 externally. Also, the cover member 150 may have a thickness less than that of the support member 140 such that the heat generated in the battery cell 120 may be easily transferred to a cooling member (not illustrated). Also, since the cover member 150 is coupled to the support member 140 and is used to form the internal space S, the cover member 150 may be formed as a sheet having a thickness of 0.5 mm or less for weight reduction and ease of manufacturing. That is, the cover member 150 may have a shape in which a sheet having a relatively thin thickness is bent. When the cover member 150 may have a structure covering at least a portion of the battery cell 120, there may be no limitation on the lower limit of the thickness thereof, but the thickness may be 0.05 mm or more, 0.1 mm or more, or 0.2 mm or more to maintain minimum rigidity The cover member 150 may be coupled to the support member 140 such that the cover member 150 and the support member 140 define an internal space S for accommodating the plurality of first and second battery cells 120. The cover member 150 may be coupled to the support member 140 by welding W and may form an internal space S of a tube shape together with the support member 140. The internal space S may be divided into a plurality of installation spaces S1 and S2 by the barrier wall 141, and a plurality of battery cells 120 may be disposed in each installation space in the length direction X1 of the barrier wall 141.

The wide surface (the side surface) of the battery cell 120 may be in contact with the barrier wall 141 of the support member 140 and the lower surface of the battery cell 120 may be in contact with the bottom portion 151 of the cover member 150. Accordingly, the heat generated in the battery cell 120 may be discharged by the support member 140 and the cover member 150.

The battery cell 120 may be configured as a pouch-type secondary battery in which three surfaces are sealed such that the lower surface and the bottom portion 151 of the battery cell 120 may be smoothly in contact with each other. In this case, the unsealed surface of the battery cell 120 may be disposed to oppose the bottom portion 151. Also, to increase heat transfer efficiency between the unsealed lower surface of the battery cell 120 and the cover member 150, a heat transfer member TA including a heat conductive adhesive may be installed on the bottom portion 151 of the cover member 150.

In some implementations, the sensing unit 170 for measuring the state (e.g., voltage) of the battery cell 120 may be disposed in the upper portion of the internal space S.

Figures 6A, 6B:
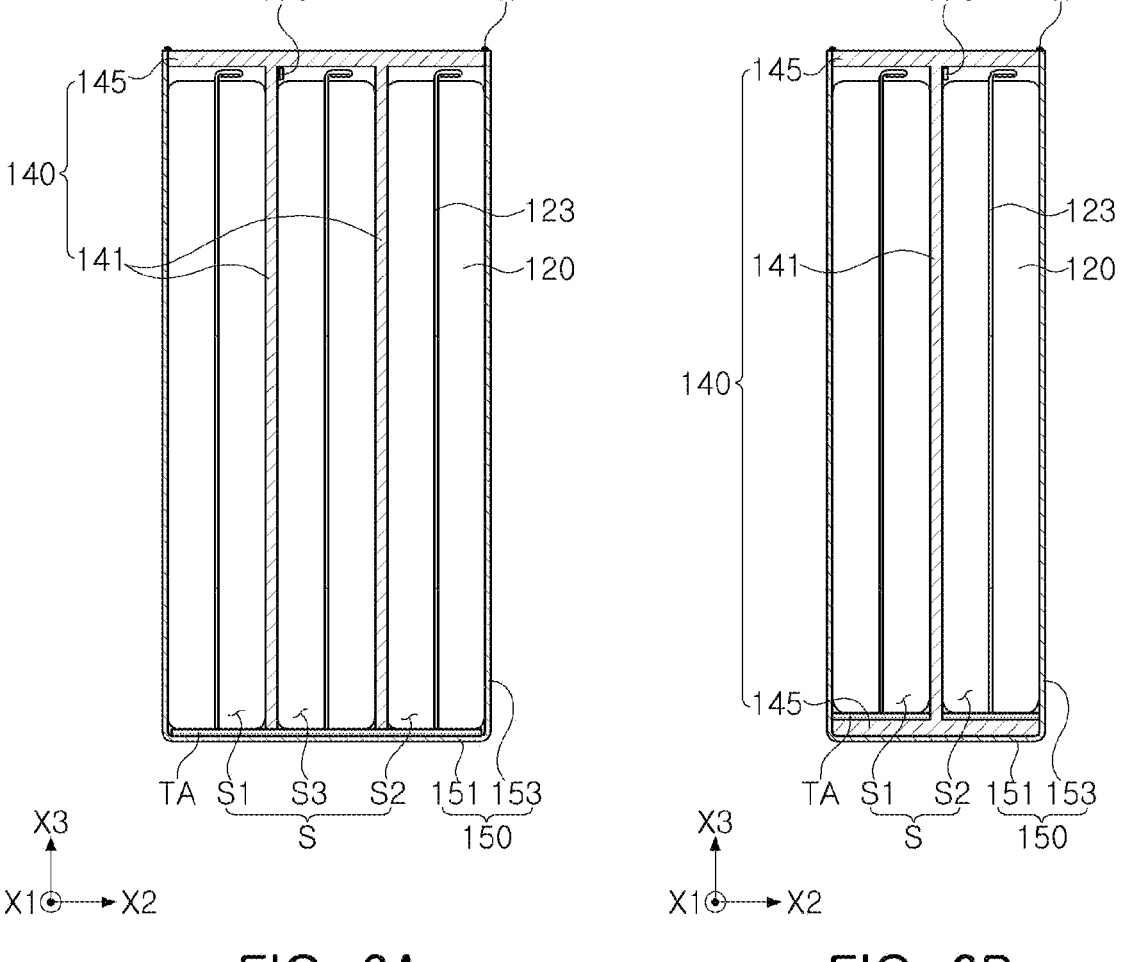
FIGS. 6A and 6B are cross-sectional diagrams illustrating a modified example of the battery cell bundle illustrated in FIG. 5.

FIGS. 6A and 6B are cross-sectional diagrams illustrating a modified example of the battery cell bundle 100 illustrated in FIG. 5. The modified example of the battery cell bundle 100 illustrated in FIGS. 6A and 6B may have substantially the same configuration as that of the battery cell bundle 100 described with reference to FIG. 5, but the shape of the support member 140 may be different in the modified example.

Referring to FIG. 6A, in an example embodiment, the support member 140 may be modified into a structure in which a plurality of barrier walls 141 are connected to the external side wall 145. When the two barrier walls 141 extend from the external side wall 145, the internal space S formed by the support member 140 and the cover member 150 may be divided into three installation spaces S1, S2, and S3. A plurality of battery cells 120 may be disposed in each of the installation spaces S1, S2, and S3 in the length direction X1 of the barrier wall 141.

Referring to FIG. 6B, in an example embodiment, the support member 140 may be modified to have a shape in which the external side wall 145 extends from both ends of the barrier wall 141 in the thickness direction of the battery cell 120. In this case, the support member 140 may have an I-shaped cross-section. Also, the cover member 150 may have a structure covering the wide surface (a side surface) of the battery cell 120 and the lower external side wall 145.

Figures 7A, 7B:
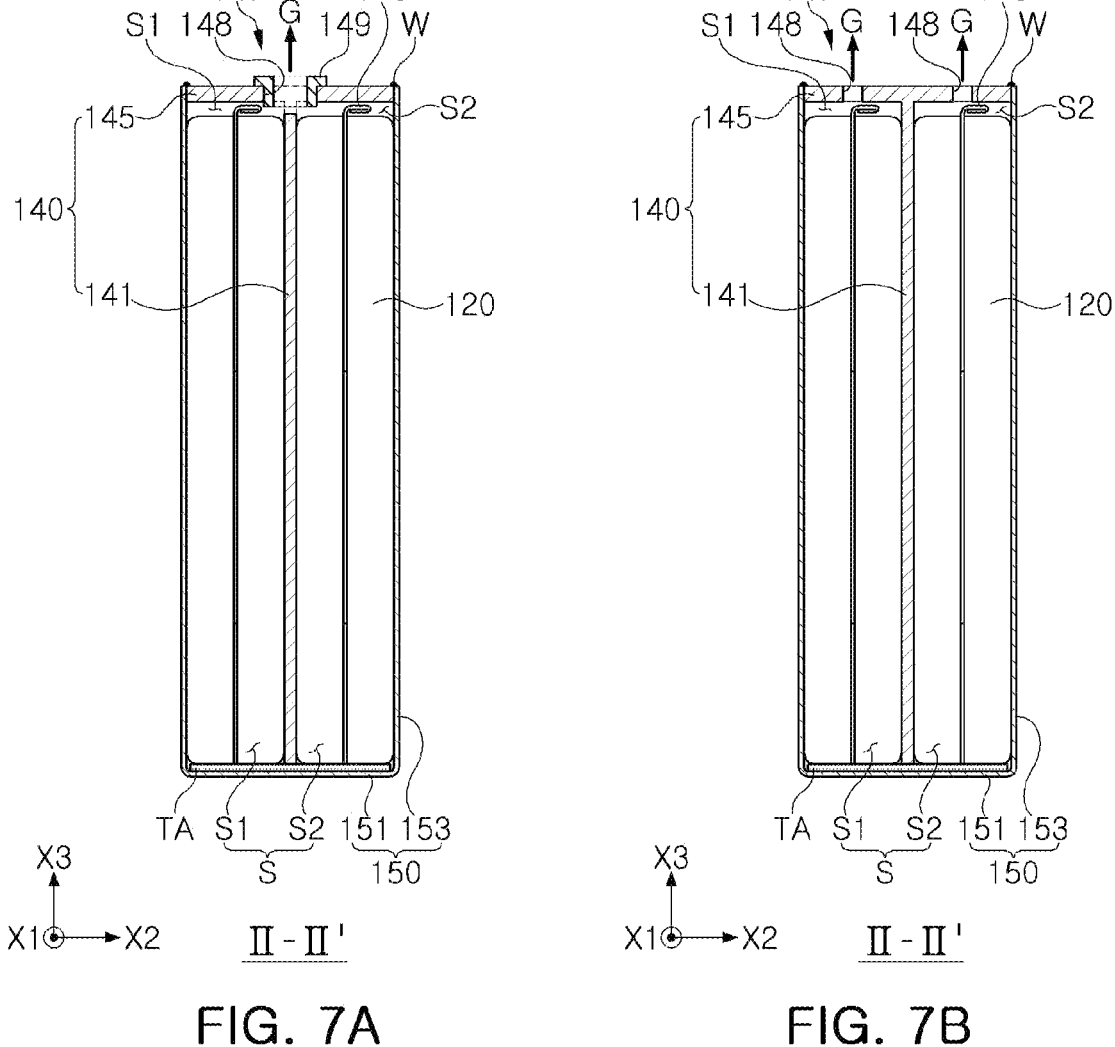
FIG. 7A is a cross-sectional diagram taken along line II-II' in FIG. 1.
FIG. 7B is a cross-sectional diagram illustrating a modified example in FIG. 7A.

FIG. 7A is a cross-sectional diagram taken along line II-II' in FIG. 1. FIG. 7B is a cross-sectional diagram illustrating a modified example in FIG. 7A.

FIG. 7A is a cross-sectional diagram illustrating a portion in which the first venting member 147 is installed, and accordingly, only the portion in which the first venting member 147 is installed may be different from the example embodiment discussed above with reference to FIG. 5.

The first venting member 147 may be installed on the support member 140 and may discharge gas G generated in the battery cell bundle 100 externally. The first venting member 147 may include a first venting hole 148 formed in the external side wall 145 of the support member 140. Also, the first venting member 147 may have a structure in which a venting unit 149 is installed on the first venting hole 148. Since the venting unit 149 may have a shape extending in the vertical direction of the external side wall 145, the gas discharged from the internal space S may be guided to have directionality and to be sprayed externally of the support member 140.

The internal space S may be divided into a plurality of installation spaces S1 and S2 by the barrier wall 141. An opening may be formed in a portion of the barrier wall 141 adjacent to the first venting hole 148 such that the gas G generated in each of the plurality of installation spaces S1 and S2 may be discharged through the first venting members 147. For example, in a portion adjacent to the first venting hole 148, a gap (opening) may be formed between the barrier wall 141 and the external side wall 145.

However, the first venting member 147 may be modified to a structure in which the first venting hole 148 is formed in each of the installation spaces S1 and S2 as illustrated in FIG. 7B.

Figure 8:
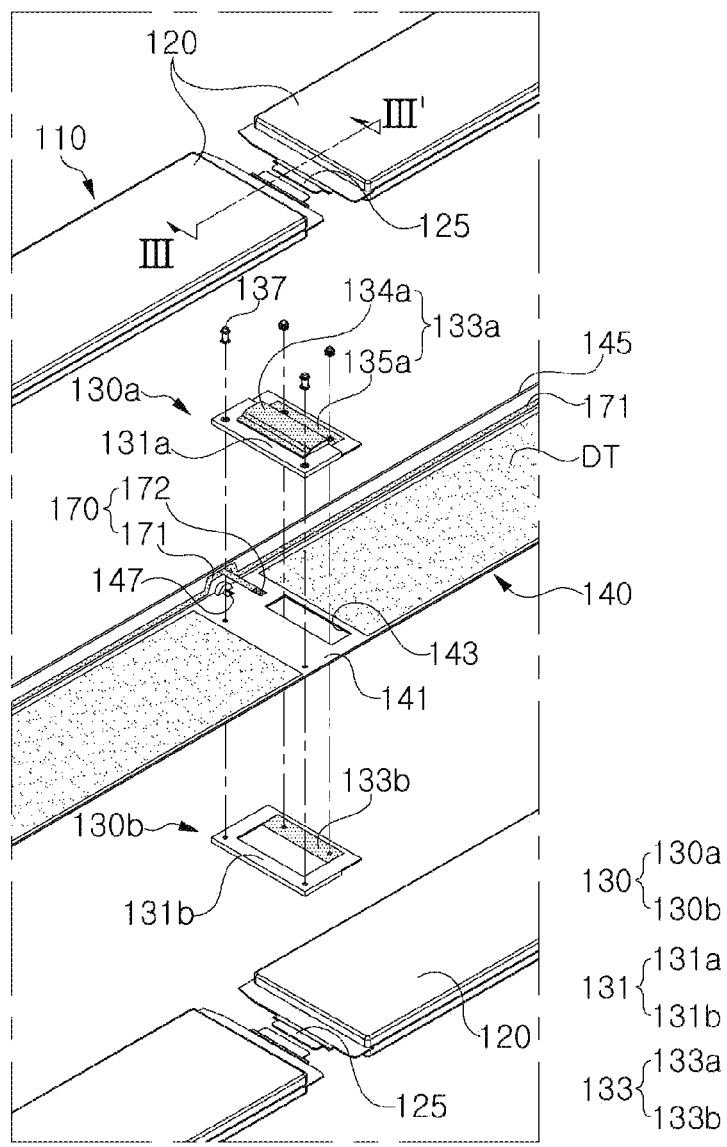
FIG. 8 is an exploded perspective diagram illustrating a support member, an internal busbar, and a battery cell for a battery cell bundle illustrated in FIG. 2.

FIG. 8 is an exploded perspective diagram illustrating a support member 140, an internal busbar 130, and a battery cell 120 with respect to a battery cell bundle 100 illustrated in FIG. 2.

The cell unit 110 may include a plurality of battery cells 120 attached to the support member 140. The plurality of battery cells 120 may be disposed on one side of the barrier wall 141 in the length direction of the barrier wall 141 with respect to the barrier wall 141 of the support member 140, and the plurality of battery cells 120 may be disposed on the other side of the barrier wall 141 in a length direction of the barrier wall 141. Each battery cell 120 may be attached to the barrier wall 141 through the bonding means DT.

The plurality of battery cells 120 may be electrically connected through the internal busbar 130. The internal busbar 130 may include an insulating body 131 formed of an insulating material and a conductive member 133 connected to the electrode lead 125 of the battery cell 120.

Also, the internal busbar 130 may include a first busbar 130a disposed on one side of the barrier wall 141 and a second busbar 130b disposed on the other side of the barrier wall 141 with respect to the barrier wall 141. The first busbar 130a may electrically connect the plurality of battery cells 120a and 120b disposed on one side of the barrier wall 141 to each other, and the second busbar 130b may electrically connect the plurality of battery cells 120c and 120d disposed on the other side of the barrier wall 141 to each other.

The first busbar 130a may include a first insulating body 131a formed of an insulating material, and a first conductive member 133a supported by the first insulating body 131a and disposed on the first insulating body 131a. The first conductive member 133a may include a first conductive portion 134a to which the electrode lead 125 of one battery cell 120a is electrically connected, and a second conductive portion 134a to which the electrode lead 125 of the other battery cell 120b is electrically connected. The first conductive portion 134a of the first conductive member 133a may connect the two battery cells 120a and 120b to each other in series.

The second busbar 130b may include a second insulating body 131b formed of an insulating material, and a second conductive member 133b supported by the second insulating body 131b and disposed on the second insulating body 131b. The second conductive member 133b may connect the two battery cells 120c and 120d to each other in series.

A portion of the first busbar 130a may be electrically connected to a portion the second busbar 130b. Also, a portion of the first busbar 130a and a portion of the second busbar 130b may penetrate the barrier wall 1141 and may be electrically connected to each other. For example, the first conductive member 133a of the first busbar 130a and the second conductive member 133*b* of the second busbar 130*b* may penetrate the barrier wall 141 and may be electrically connected to each other. To this end, a connection opening 143 may be formed through the barrier wall 141 such that the first conductive member 133*a* and the second conductive member 133*b* may be in contact with and may be electrically connected to each other.

The first busbar 130*a* may be fixed to and installed on one side of the barrier wall 141, and the second busbar 130*b* may be fixed to and installed on the other side of the barrier wall 141. For example, the first busbar 130*a* and the second busbar 130*b* may be fastened to the barrier wall 141 by the fastening portion 137. In this case, the fastening portion 137 may have a structure in which the first busbar 130*a* and the second busbar 130*b* may be fastened together to the barrier wall 141. Accordingly, the simplified and stable fixing structure of the internal busbar 130 may be provided. However, the structure may be modified into the structure in which the first busbar 130*a* and the second busbar 130*b* are independently fastened to the barrier wall 141.

A sensing unit 170 for measuring an electrical state (e.g., voltage) and/or a physical state (e.g., temperature) of the battery cell 120 may be installed in the space adjacent to the external side wall 145 of the support member 140. The sensing unit 170 may be provided to measure a voltage or temperature of the battery cell 120. The sensing unit 170 may include sensing members such as a voltage sensing terminal 172 connected to the internal busbar 130 to measure a voltage of the battery cell 120 and a temperature sensor (not illustrated) installed to measure the temperature of the battery cell 120. Also, the sensing unit 170 may include a circuit member 171 to transmit a signal received from the voltage sensing terminal 172, the temperature sensor, and others, externally of the battery cell bundle 100. As an example, the circuit member 171 may be configured as a flexible circuit board (FPCB) or a wire. The circuit member 171 may be drawn out through an opening (not illustrated) formed in the support member 140 or the panel member 160 and may be electrically connected to a battery management system (BMS). Accordingly, the voltage signal sensed by the voltage sensing terminal 172 may be transmitted to the battery management system 440 (in FIG. 27) through the circuit member 171. The battery management system may receive the voltage signal and the temperature signal and may monitor and manage the voltage state and/or the temperature state of the battery cell 120. The voltage sensing terminal 172 may include a voltage sensor directly measuring a voltage of the battery cell 120.

The circuit member 171 may be disposed in the length direction of the support member 140 along the space adjacent to the external side wall 145 of the support member 140. In this case, in the region in which the first venting member 147 is installed, the circuit member 171 may have a shape bypassing the first venting member 147. The voltage sensing terminal 172 may be bonded to the conductive member 133 of the internal busbar 130 through welding, and may be used to measure the voltage of the battery cell 120.

Figure 9:
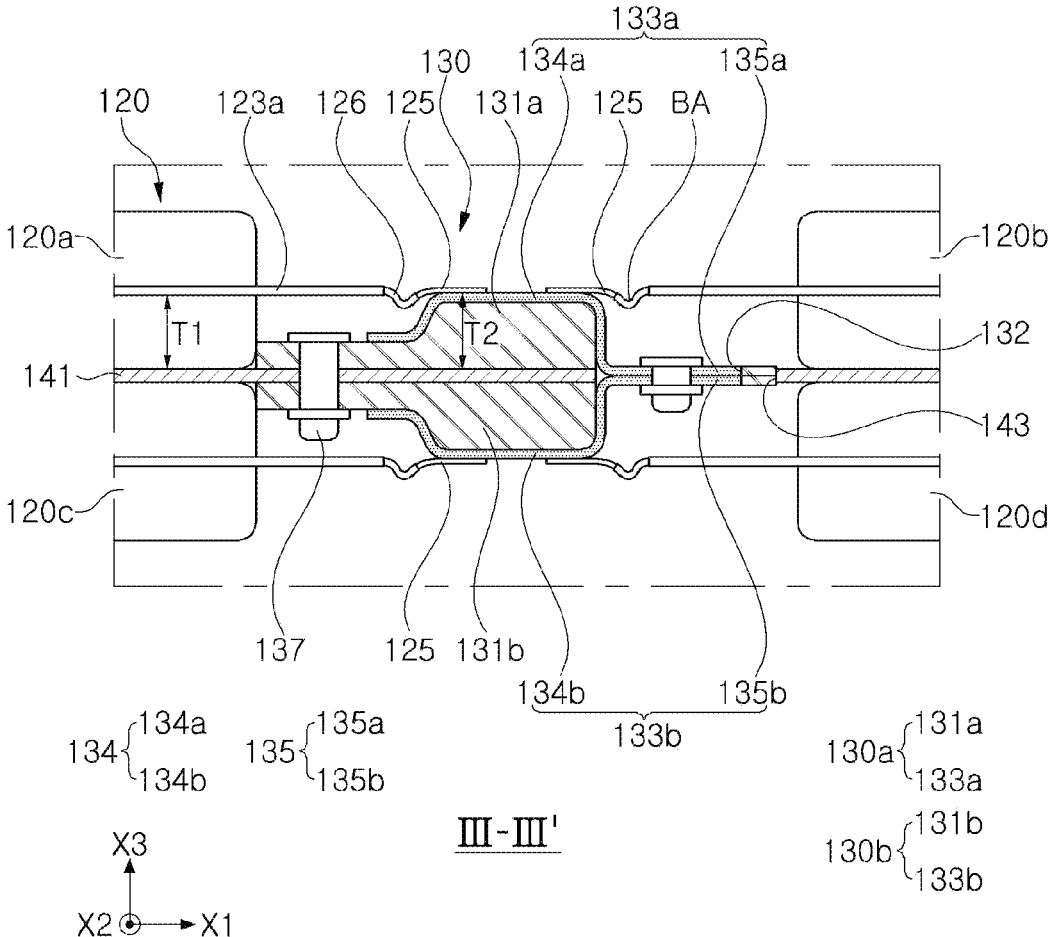
FIG. 9 is a cross-sectional diagram taken along line III-III' in FIG. 8.

FIG. 9 is a cross-sectional diagram taken along line III-III' in FIG. 8.

Referring to FIG. 9 together with FIG. 8, the internal busbar 130 may be configured to be divided on both sides with respect to the barrier wall 141. That is, the internal busbar 130 may be divided into the first busbar 130*a* disposed on one side (the upper side in FIGS. 8 and 9) of the barrier wall 141 and the second busbar 130*b* disposed on the other side (the lower side in FIGS. 8 and 9) of the barrier wall 141. The first busbar 130*a* and the second busbar 130*b* may be fastened to the barrier wall 141 by the fastening portion 137. To reduce the number of fastening portions 137, the fastening portions 137 may have a structure in which the first busbar 130*a* and the second busbar 130*b* are simultaneously fastened to the barrier wall 141. Through this fastening structure, the fastening of the internal busbar 130 may be easily performed, and also a simplified and stable fixing structure may be provided.

The first busbar 130*a* may include a first conductive member 133*a* having electrical conductivity, electrically connected to the electrode lead 125 of the battery cell 120. The first conductive member 133*a* may include a first conductive portion 134*a* to which the electrode lead 125 of one battery cell 120*a* is connected, and a second conductive portion 135*a* to which the electrode lead 125 of the other battery cell 120*b* is connected. Since the first conductive portion 134*a* and the second conductive portion 135*a* are integrated with each other, the battery cell 120*a* on one side and the other battery cell 120*b* on the other side may be connected to each other in series by the first conductive member 133*a*.

For electrical insulation between the first conductive member 133*a* and the barrier wall 141, the first busbar 130*a* may include a first insulating body 131*a*. Accordingly, the first conductive portion 134*a* may be insulated from the barrier wall 141 through the first insulating body 131*a*.

In this case, the distance T2 between the barrier wall 141 and the electrode lead 125 may have substantially the same value as that of the distance T1 between the barrier wall 141 and the second sealing portion 123*a*. For example, the distance T2 between the barrier wall 141 and the electrode lead 125 may have a value of 0.95 to 1.05 times the distance T1 between the barrier wall 141 and the second sealing portion 123*a*. Here, the second sealing portion 123*a* may be a sealing portion corresponding to the portion in which the electrode lead 125 is exposed.

Also, a portion of the electrode lead 125 in contact with the internal busbar 130 may be disposed on the same plane as the second sealing portion 123*a*. That is, the end of the electrode lead 125 may be disposed on the extension line of the second sealing portion 123*a*. In this case, the electrode lead 125 may have substantially the same height as that of the second sealing portion 123*a* with respect to the barrier wall 141. Therefore, when electrically connecting the electrode lead 125 to the first conductive member 133*a*, the process of additionally processing the electrode lead 125 to adjust the height between the electrode lead 125 and the first conductive member 133*a* may not be necessary. The first insulating body 131*a* may have a thickness (the distance in the thickness direction of the battery cell) such that the electrode lead 125 and the second sealing portion 123*a* may have substantially the same height.

The second busbar 130*b* may include a second conductive member 133*b* having electrical connectivity, electrically connected to the electrode lead 125 of the battery cell 120. The second conductive member 133*b* may include a first conductive portion 134*b* to which the electrode lead 125 of one battery cell 120*c* is connected, and a second conductive portion 135*b* to which the electrode lead 125 of the other battery cell 120*d* is connected. Since the first conductive portion 134*b* and the second conductive portion 135*b* are integrated with each other, the battery cell 120*c* on one side and the other battery cell 120*d* on the other side may be connected to each other in series by the second conductive member 133*b*.

For electrical insulation between the second conductive member 133*b* and the sidewall, the second busbar 130*b* may include a second insulating body 131b. Accordingly, the second conductive portion 134b may be insulated from the barrier wall 141 through the second insulating body 131b.

The second insulating body 131b may also have a thickness (a distance in the thickness direction of the battery cell 120) such that the electrode lead 125 and the second sealing portion 123a may have substantially the same height, similarly to the first insulating body 131a. Accordingly, for the electrical connectivity between the electrode lead 125 and the second conductive member 133b, the process of further processing the electrode lead 125 to adjust the height of the electrode lead 125 may not be necessary.

The second conductive portion 135a of the first conductive member 133a and the second conductive portion 135b of the second conductive member 133b may be electrically connected through the opening 143 of the barrier wall 141 for connection. Also, a connection hole 132 connecting the second conductive portion 135a of the first conductive member 133a and the second conductive portion 135b of the second conductive member 133b may be formed through the first insulating body 131a and the second insulating body 131b. As the second conductive portion 135a of the first conductive member 133a and the second conductive portion 135b of the second conductive member 133b are in contact with each other, a parallel connection structure may be formed between the battery cells 120a and 120b disposed on one side of the barrier wall 141 and the battery cells 120c and 120d disposed on the other side of the barrier wall 141.

Accordingly, in an example embodiment, the battery cells 120a and 120b on one side of the barrier wall 141 may be electrically connected to each other in series by the internal busbar 130, the battery cells 120c and 120d on the other side of the barrier wall 141 may be electrically connected to each other in series, and the battery cells 120a and 120b on one side of the barrier wall 141 and the battery cells 120c and 120d on the other side may be electrically connected to each other in parallel. Therefore, in the example embodiment, series and parallel connection structures may be easily implemented between the plurality of battery cells 120 through the internal busbar 130 with a simplified structure.

Also, in an example embodiment, since the parallel connection structure of the battery cells 120 may be implemented, when the voltage sensing terminal 172 of the sensing unit 170 is electrically connected to one of the first conductive member 133a and the second conductive member 133b, the voltage of the battery cells 120 on both sides of the barrier wall 141 may be simultaneously measured.

In an example embodiment, the electrode lead 125 and the internal busbar 130 may be in surface-contact with and electrically connected to each other. Accordingly, the contact area between the electrode lead 125 and the internal busbar 130 may increase, such that electrical resistance may be reduced. Also, a coupling force between the electrode lead 125 and the internal busbar 130 may improve.

In an example embodiment, in the battery cell 120, a bending portion BA having a curvature may be formed in the electrode lead 125 or the insulating portion 126 portion. This bending portion BA may absorb impact when external vibrations or impact occurs and may reduce damages to the coupling state between the electrode lead 125 and the internal busbar 130 or damages to the electrode lead 125.

Figure 10:
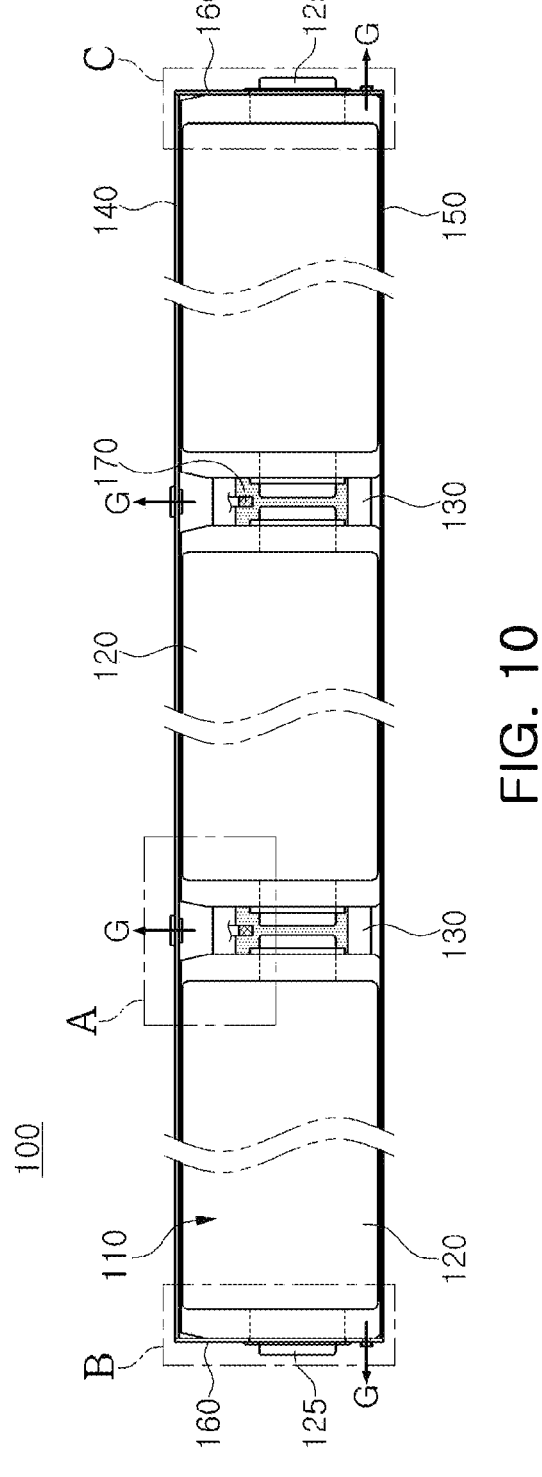
FIG. 10 is a diagram illustrating a dispositional structure of battery cells with respect to the battery cell bundle illustrated in FIG. 2.

FIG. 10 is a diagram illustrating a dispositional structure of battery cells 120 with respect to the battery cell bundle 100 illustrated in FIG. 2.

The plurality of battery cells 120 forming the cell unit 110 may be disposed in the space formed by the support member 140, the cover member 150 and the panel member 160. The plurality of battery cells 120 may be electrically connected to each other by an internal busbar 130, and the electrode leads 125 of the battery cell 120 disposed on an external side of the support member 140 may be exposed through the panel member 160.

In this case, the gas G generated in the battery cell 120 in the battery cell bundle 100 may be discharged externally through the support member 140 corresponding to the space in which the internal busbar 130 is disposed, or may be discharged externally through the panel member 160.

Figure 11:
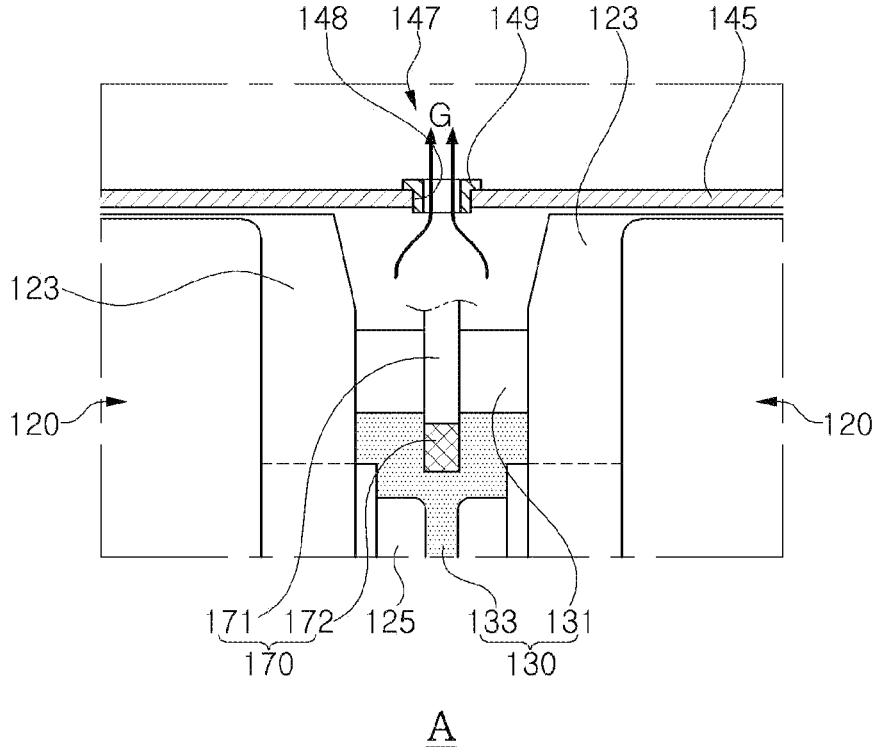
FIG. 11 is an enlarged diagram illustrating portion "A" in FIG. 10.

FIG. 11 is an enlarged diagram illustrating portion "A" in FIG. 10.

The voltage sensing terminal 172 of the sensing unit 170 may be bonded to the conductive member 133 of the internal busbar 130 through welding, and may be used to measure a voltage of the battery cell 120. In this case, the voltage sensing terminal 172 of the sensing unit 170 may be connected to the conductive member 133 on one side of the barrier wall 141, and may simultaneously measure the voltage of the battery cells 120 on both sides of the barrier wall 141.

A first venting member 147 may be disposed on the external side wall 145 of the support member 140 corresponding to the internal busbar 130 portion. The first venting member 147 may include a first venting hole 148 and a venting unit 149 installed therein. The venting unit 149 may have a shape extending in the thickness direction of the external side wall 145 such that the gas generated in the battery cell bundle 100 may be discharged with directionality. The venting unit 149 may have an open structure constantly, or may have an open structure when the pressure in the battery cell bundle 100 becomes equal to or greater than a predetermined pressure.

When the battery cell 120 is a pouch-type secondary battery, since the sealing force of the sealing portion 123 on which the electrode lead 125 is disposed may be the weakest, when an event occurs in the battery cell 120, the electrolyte gas in the battery cell 120 may be discharged through the sealing portion 123 of the portion in which the electrode lead 125 is disposed. In the example embodiment, since the first venting member 147 is installed on the external side wall 145 corresponding to the portion of the internal busbar 130 to which the electrode lead 125 is connected, the gas G may be swiftly discharged externally.

Figures 12A, 12B:
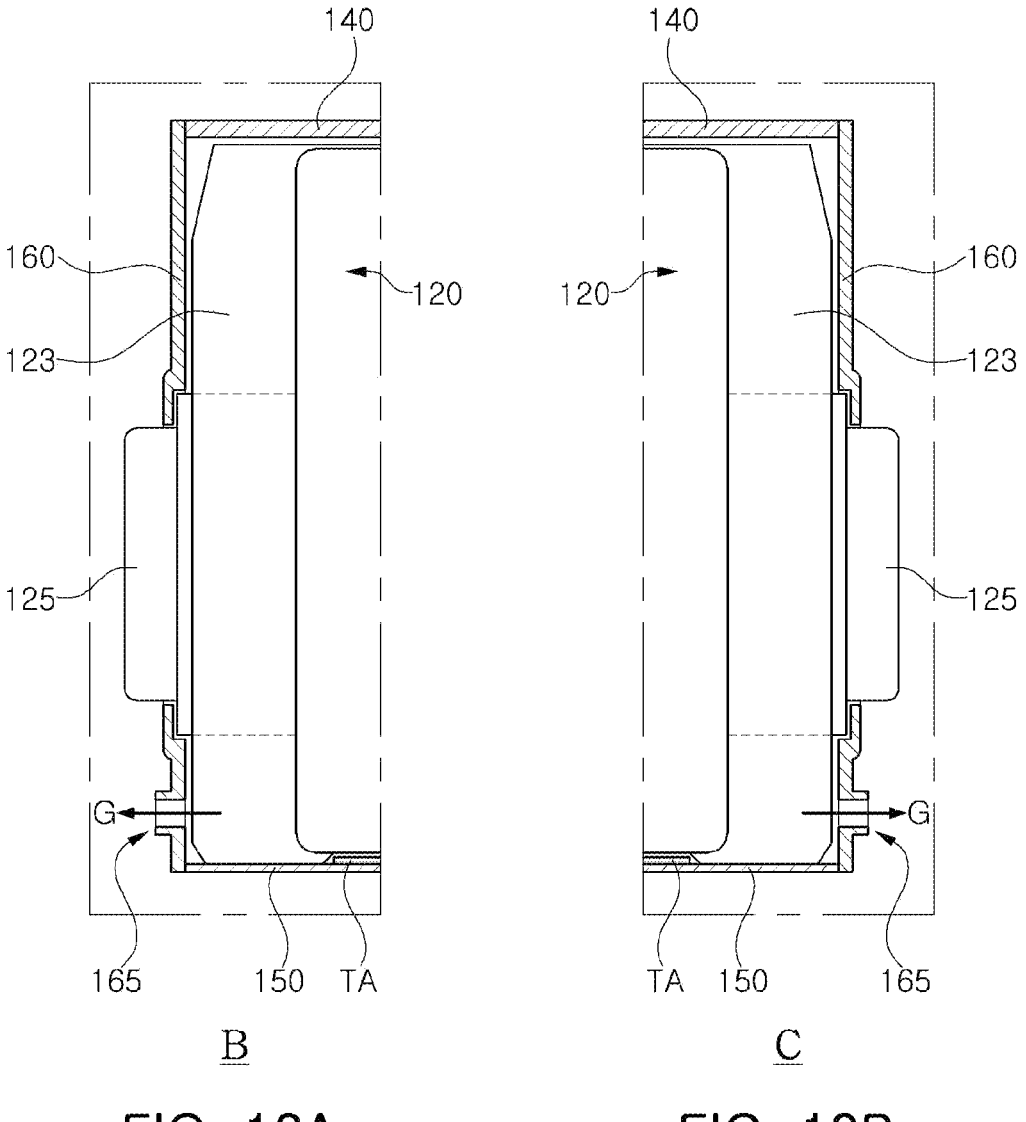
FIGS. 12A and 12B are enlarged diagram illustrating portions "B" and "C" in FIG. 10, respectively.

FIGS. 12A and 12B are enlarged diagram illustrating portions "B" and "C" in FIG. 10, respectively.

The second venting member 165 may include a second venting hole formed in the panel body 161 of the panel member 160, or a separate venting unit (see the venting unit of the first venting member) may be installed.

As described above, when the battery cell 120 is a pouch-type secondary battery, since the sealing force of the sealing portion 123 in which the electrode lead 125 is disposed may be the weakest, the electrolyte gas may leak easily through this portion. In an example embodiment, since the second venting member 165 may be installed on the panel member 160 in which the electrode lead 125 is disposed, the gas G generated in the battery cell bundle 100 may be swiftly discharged externally.

Also, the second venting member 165 may have a shape extending in the length direction of the battery cell bundle 100 such that the gas generated in the battery cell bundle 100 may be discharged with directionality.

As described above, in an example embodiment, by accommodating the plurality of battery cells 120 in the internal space S of the battery cell bundle 100, the gas generated in one of the battery cell bundles 100 may have a smaller effect on the other battery cells disposed outside. Also, the gas generated in the battery cell 120 accommodated in the battery cell bundle 100 may be swiftly discharged in a specific direction or position, thereby easily performing control of the flow of the discharged gas. Accordingly, in an example embodiment, the thermal runaway phenomenon may be delayed or reduced.

In the description below, a method of manufacturing the battery cell bundle 100 according to an example embodiment will be described with reference to FIGS. 13A to 13F. FIGS. 13A to 13F are perspective diagrams illustrating a method of manufacturing a battery cell bundle in sequence.

Figure 13A:
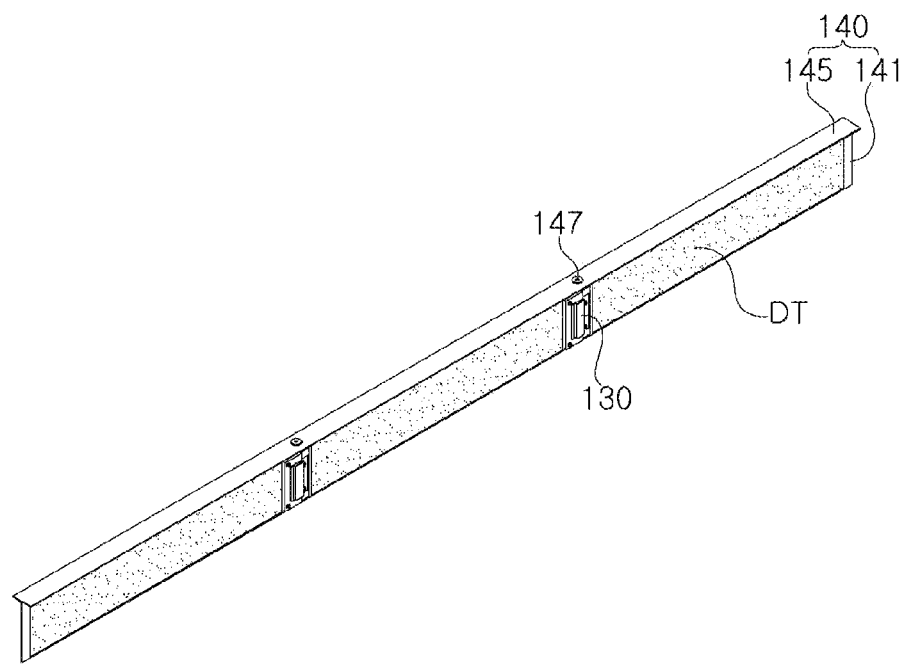
FIGS. 13A to 13F are perspective diagrams illustrating a method of manufacturing a battery cell bundle in sequence.

As illustrated in FIG. 13A, a support member 140 having a barrier wall 141 and an external side wall 145 may be prepared. The support member 140 may have a T-shaped cross-section, but an example embodiment thereof is not limited thereto, and the support member 140 may have an I-shaped cross-section. A first venting member 147 for discharging gas may be installed on the support member 140. The internal busbar 130 may be fixed to the barrier wall 141 of the support member 140 by a generally used coupling means. To fix the battery cell 120 to the barrier wall 141 of the support member 140, a bonding means DT, such as double-sided tape, may be disposed on the barrier wall 141.

Figure 13B:
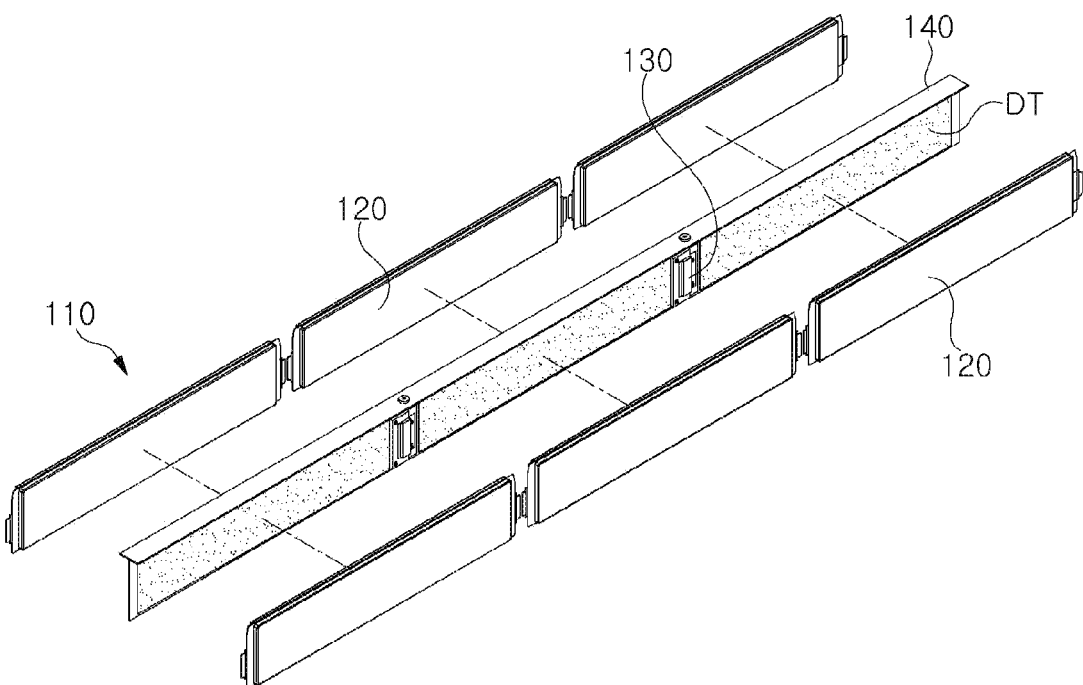

Thereafter, as illustrated in FIG. 13B, a cell unit 110 including a plurality of battery cells 120 may be installed on both sides of the support member 140. For example, three battery cells 120 may be installed on one side and the other side of the support member 140. The battery cell 120 may be fixed to the support member 140 through the bonding means DT.

Figure 13C:
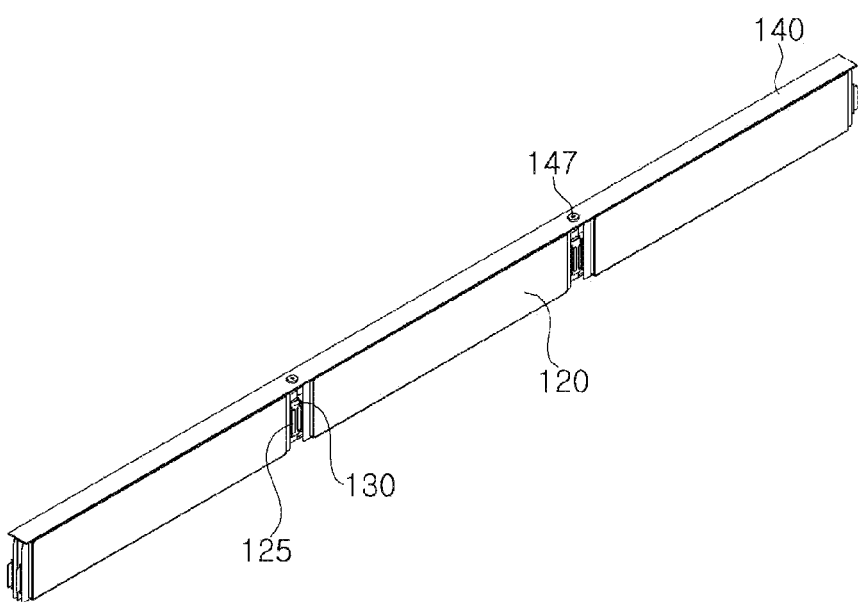

FIG. 13c illustrates a state in which the battery cell 120 is coupled to the support member 140. In this case, each battery cell 120 may be electrically connected by the internal busbar 130. For electrical connectivity between the battery cell 120 and the internal busbar 130, the electrode lead 125 of the battery cell 120 may be welded to the internal busbar 130.

Figure 13D:
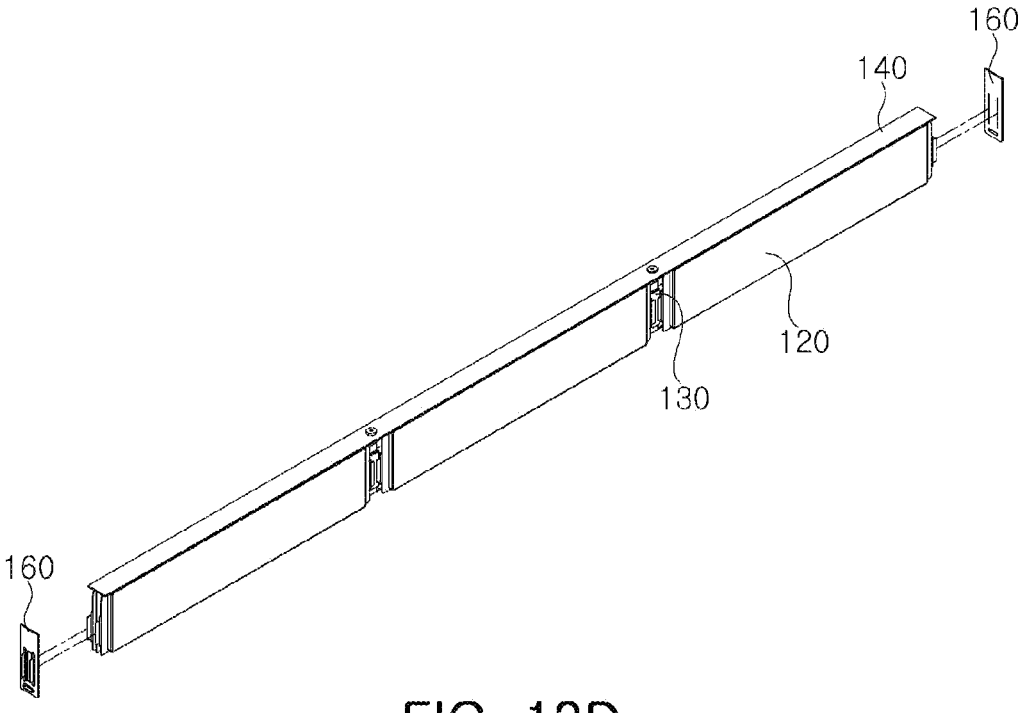

Thereafter, as illustrated in FIG. 13D, the panel member 160 may be connected to the battery cell 120 disposed on an outer region of the support member 140. In this case, the panel member 160 and the support member 140 may be fixed by a generally used coupling means such as welding. The fixing of the panel member 160 and the support member 140 may be performed in the process of connecting the panel member 160 to the battery cell 120 as illustrated in FIG. 13D, or may be performed together than the welding operation performed in FIG. 13F.

Figures 13E, 13F:
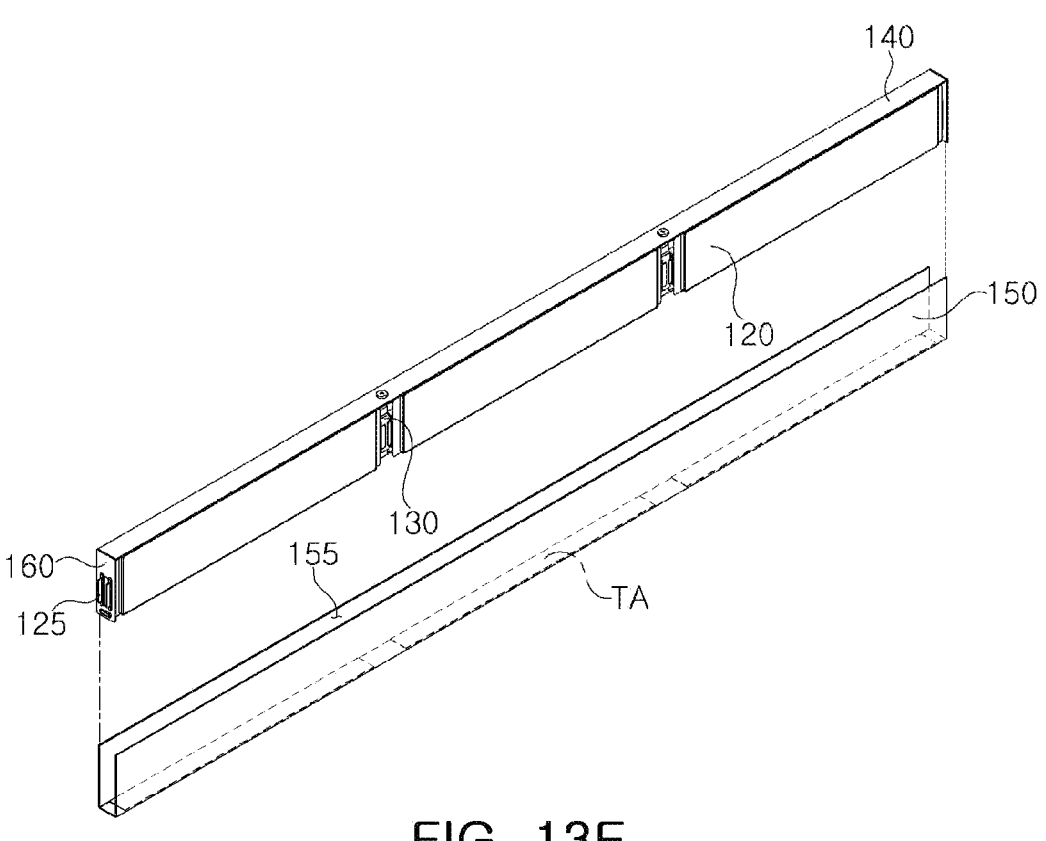

As illustrated in FIG. 13E, when the battery cell 120 and the panel member 160 disposed on the outer region of the support member 140 are combined, the electrode lead 125 may be exposed externally. The assembly in which the internal busbar 130, the battery cell 120, and the panel member 160 are coupled to the support member 140 may be accommodated in the accommodation space 155 of the cover member 150. In this case, to increase a heat transfer efficiency between the lower surface of the battery cell 120 and the cover member 150, a heat transfer member TA including a thermally conductive adhesive may be installed on the bottom portion 151 of the cover member 150.

FIG. 13f illustrates a state in which the support member 140, the panel member 160 and the cover member 150 are assembled. To fix the cover member 150, the cover member 150 may be welded to the support member 140 and/or the panel member 160. For example, the cover member 150 and the support member 140 may be welded along the first welding line L1, and the cover member 150 and the panel member 160 may be welded along the second welding line L2. The support member 140 and the panel member 160 may also be welded to each other. Accordingly, the contact surface between the support member 140, the panel member 160, and the cover member 150 may be bonded in a state in which airtightness is maintained. In some implementations, the gas generated in the internal space S of the battery cell bundle 100 may be discharged externally through the first venting member 147 provided in the support member 140 and the second venting member 165 provided in the panel member 160.

Through the process described above, the battery cell bundle 100 having a structure in which the battery cell 120 is accommodated in the space between the support member 140 and the cover member 150 may be easily manufactured.

In the description below, the battery cell assembly 200 according to an example embodiment will be described with reference to FIGS. 14 to 18.

Figure 14:
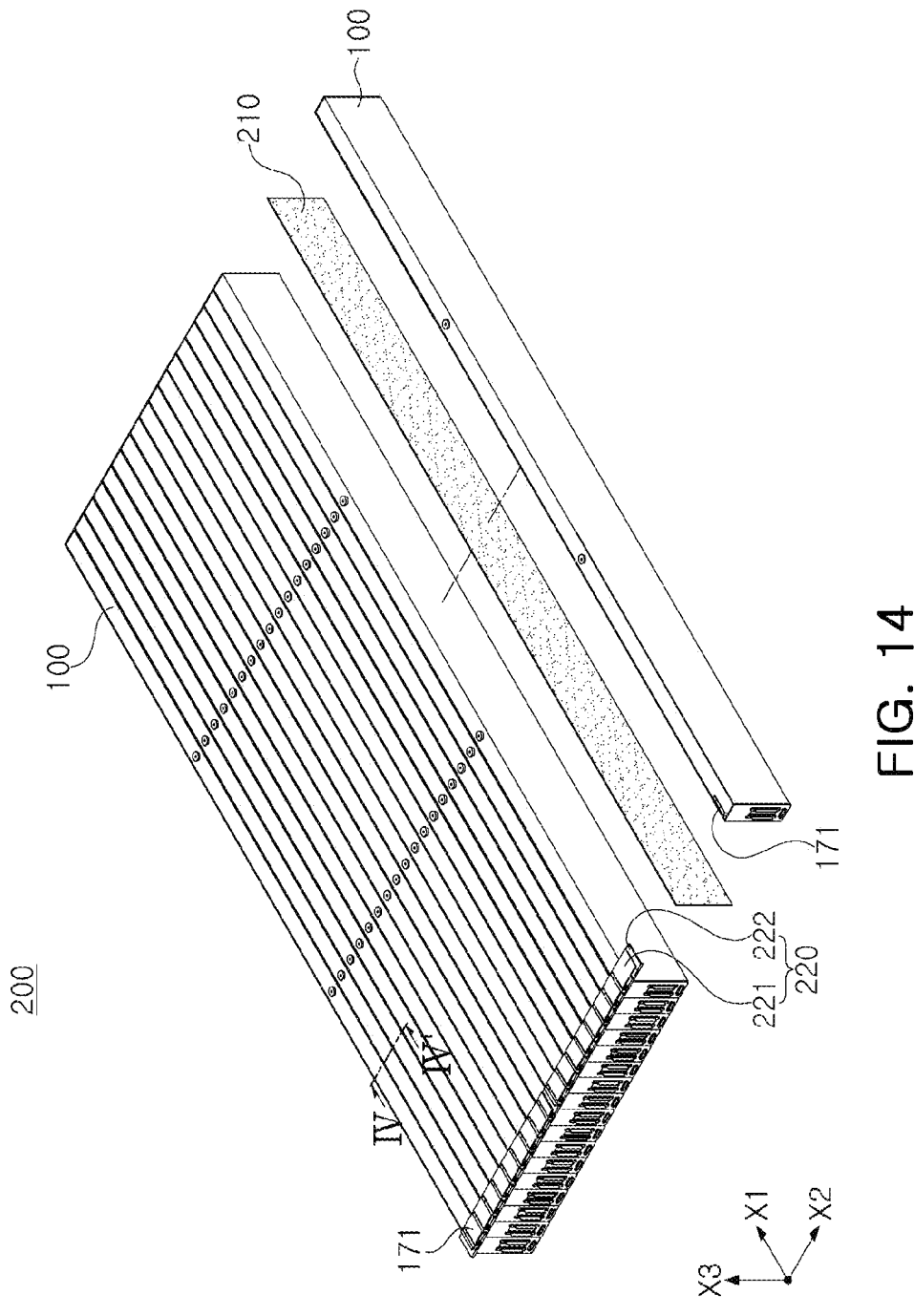
FIG. 14 is a perspective diagram illustrating a battery cell assembly according to an example embodiment of the disclosed technology.
Figure 15:
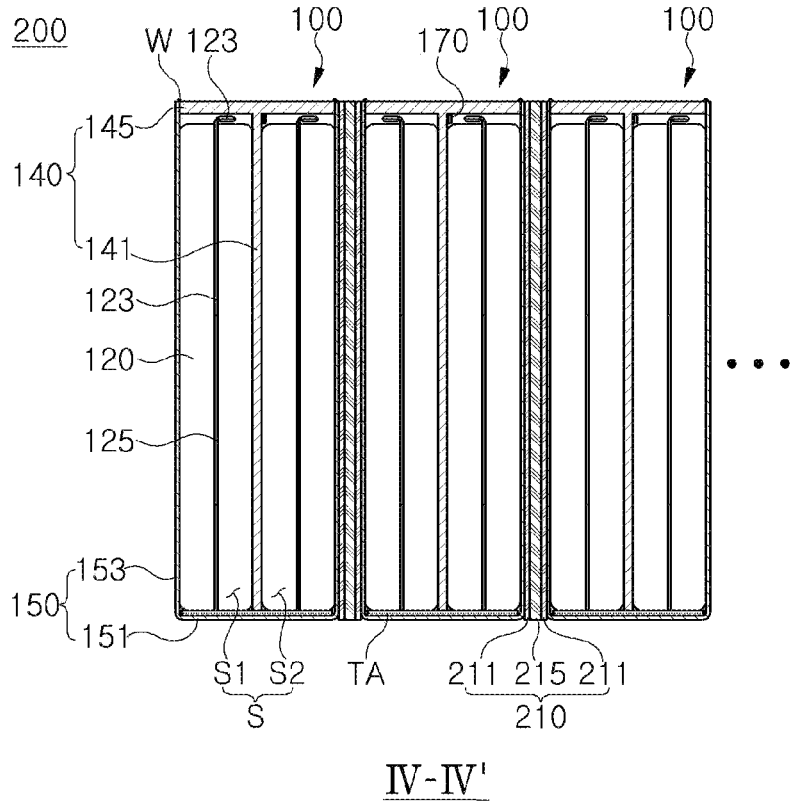
FIG. 15 is a cross-sectional diagram taken along line IV-IV' in FIG. 14.

FIG. 14 is a perspective diagram illustrating a battery cell assembly 200 according to an example embodiment. FIG. 15 is a cross-sectional diagram taken along line IV-IV' in FIG. 14.

Referring to FIG. 14, the battery cell assembly 200 according to an example embodiment may include a plurality of battery cell bundles 100 and a heat or flame spread blocking member 210 provided between at least a portion of the battery cell bundles 100. Also, the battery cell assembly 200 according to an example embodiment may include a circuit connection member 220 electrically connected to the circuit member 171 exposed externally of the battery cell bundle 100.

The circuit connection member 220 may include a circuit portion 221 electrically connected to the circuit member 171 installed on each of the plurality of battery cell bundles 100, and an insulating support portion 222 insulating the battery cell bundle 100 and the circuit portion 221. The insulating support unit 222 may be formed of a film or plate formed of an insulating material, and may support the circuit portion 221.

Figure 27:
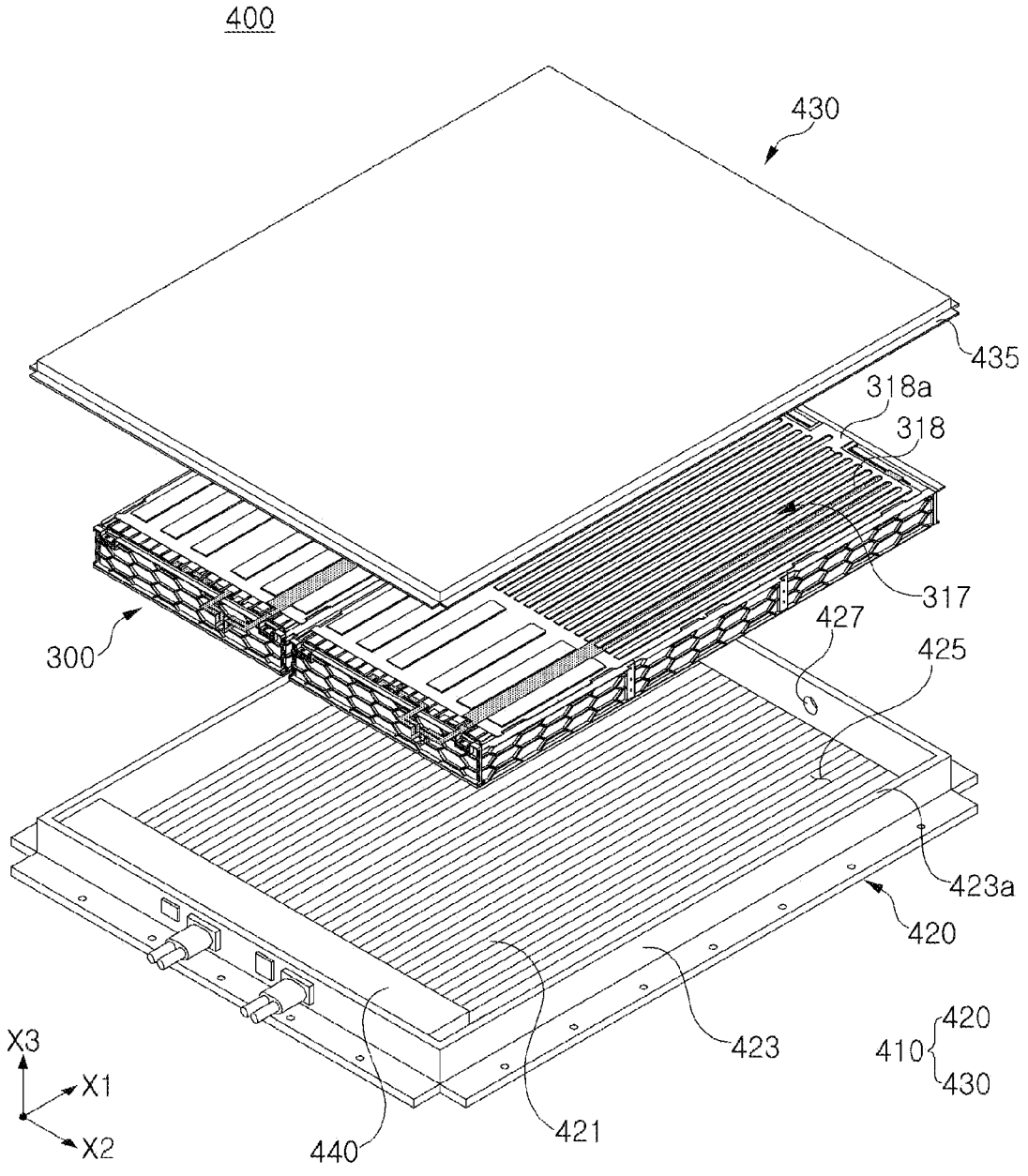
FIG. 27 is an exploded perspective diagram illustrating a battery pack according to an example embodiment of the disclosed technology.

The circuit connection member 200 may transmit a voltage/temperature signal received from each of the plurality of battery cell bundles 100 to the battery management system 440 (in FIG. 27). The circuit connection member 200 may be configured as a printed circuit board (PCB), or may also be configured as a flexible printed circuit board (FPCB).

As illustrated in FIG. 15, the battery cell assembly 200 according to an example embodiment may include a plurality of battery cell bundles 100, and each battery cell bundle 100 may include a plurality of battery cells 120. The heat or flame spread blocking member 210 may block the heat and/or flames generated in one of the battery cell bundles 100 from spreading to the battery cell bundle 100 adjacent to one of the battery cell bundles 100. In the example embodiments, the heat or flame spread blocking member 210 may be defined as a component for blocking the spread of at least one of heat and flames.

The battery cell bundle 100 disposed in the battery cell assembly 200 may have one of the components in the aforementioned example embodiments of the battery cell bundle 100 described with reference to FIGS. 1 to 12. For example, each of the battery cell bundles 100 may include a support member 140 having a barrier wall 141, a plurality of battery cells 120 disposed on both sides of the barrier wall 141, a cover member 150 surrounding at least a portion of the external circumferential surface of the 120, and a panel member 160 (in FIG. 1) covering the open end of the internal space S. The cover member 150 may include a bottom portion 151 covering a lower surface of the battery cell 120 and a side portion 153 covering a side surface of the battery cell 120. The cover member 150 may be coupled to the support member 140 by welding W and may form a tube-shaped internal space S together with the support member 140.

Also, the internal space S formed by the support member 140 and the cover member 150 may be divided into a plurality of installation spaces S1 and S2 by the barrier wall 141. The plurality of battery cells 120 may be disposed in each of the installation spaces S1 and S2 in the length direction of the barrier wall 141 (see FIG. 17). The battery cell 120 may be a pouch-type secondary battery, and a sealing portion 123 may be formed on three surfaces other than the lower surface. In this case, a heat transfer member TA including a thermal conductive adhesive to transfer the heat generated in the battery cell 120 to the cover member 150 may be disposed between the lower surface of the battery cell 120 and the bottom portion 151 of the cover member 150. Also, the sensing unit 170 for measuring the state (e.g., voltage) of the battery cell 120 may be disposed in the upper portion of the internal space S.

In some implementations, the battery cell bundle 100 illustrated in FIGS. 13-15 may be similar or identical to the battery cell bundle 100 described above with reference to FIGS. 1 to 12.

The battery cell assembly 200 may be formed by combining a plurality of battery cell bundles 100, and a heat or flame spread blocking member 210 may be installed between at least a portion of the adjacent battery cell bundles 100. FIG. 15 illustrates a state in which three battery cell bundles 100 are combined, but the number of battery cell bundles 100 included in the battery cell assembly 200 may be varied. For example, the battery cell assembly 200 may include four or more battery cell bundles 100 to correspond to the size of a space (e.g., a pack housing) in which the battery cell assembly 200 is installed.

When various events occur, such as, when the lifespan of the battery cell 120 approaches an end point, when over-charging and/or overheating occurs in the battery cell 120, or when an external impact acts on the battery cell 120, the temperature of the battery cell 120 may rapidly increase, or the battery cell 120 may ignite or explode. Heat and/or flames generated in a portion of the battery cells 120 may spread to the adjacent battery cells 120, such that a thermal runaway phenomenon in which the plurality of battery cells 120 are exploded in sequence may occur. In an example embodiment, the battery cell assembly 200 may include the heat or flame spread blocking member 210, such that heat and/or flames generated in a portion of the battery cells 120 or the battery cell bundle 100 may be blocked from spreading to the adjacent battery cell bundle 100.

The heat or flame spread blocking member 210 may include a heat insulating member 211 including a heat insulating material to thermally block the adjacent battery cell bundle 100. The heat insulating member 211 may be formed of a heat insulating material having low thermal conductivity. Also, the heat insulating member 211 may have heat resistance and fire resistance to withstand high heat and flames generated when an event occurs. As an example, the heat insulating member 211 may include mica having both heat resistance and heat insulation properties. However, the material of the heat insulating member 211 is not limited thereto, and may include at least a portion of silicate, ceramic, glass fiber, and mineral fiber. Also, various generally used materials may be used as the heat insulating member 211 as long as the material has heat insulating properties and heat resistance. Also, the heat insulating member 211 may have the form of a pad, a plate, or a sheet.

The heat or flame spread blocking member 210 may further include a compression member 215 which may be compressively deformable, together with the heat insulating member 211. Since the compression member 215 may be compressed when the battery cell 120 expands due to a swelling phenomenon, the expansion of the entire volume of the battery cell assembly 200 may be prevented. Also, the compression member 215 may be formed of an elastically deformable material. As an example, the compression member 215 may include a polyurethane material, but the material is not limited thereto. Also, the compression member 215 may be attached to the heat insulating member 211 in the form of a pad. Various generally used adhesive materials such as double-sided tape and hot melt may be used for bonding the compression member 215 to the heat insulating member 211.

The heat or flame spread blocking member 210 may form a sandwich structure in which the heat insulating member 211 and the compression member 215 are stacked. For example, the heat or flame spread blocking member 210 may have a structure in which the heat insulating member 211 is attached to both surfaces of the compression member 215. That is, the compression member 215 may be disposed between the heat insulating members 211 and may have a shape in which the heat insulating member 211 is exposed externally. In this case, the heat insulating member 211 may oppose the battery cell bundle 100. The example embodiment in FIG. 15 may have a structure in which the heat insulating member 211 having high thermal insulation and heat resistance opposes the battery cell bundle 100, such that the spreading of heat and/or flames generated in one of the battery cell bundles 100 due to thermal runaway to the adjacent battery cell bundle 100 may be effectively blocked. Also, in an example embodiment illustrated in FIG. 15, since the heat insulating member 211 protects the compression member 215 from heat and/or flames by covering the compression member 215 having low heat resistance and fire resistance, the phenomenon in which the compression member 215 ignites or burns may be reduced when thermal runaway occurs.

The heat insulating member 211 may be fixed to the battery cell bundle 100 by an adhesive member (not illustrated) such as double-sided tape. The thickness of the insulating member 211 and the compression member 215 may be determined in consideration of heat resistance performance required for the battery cell assembly 200 and the swelling amount of the battery cell 120.

Figure 16:
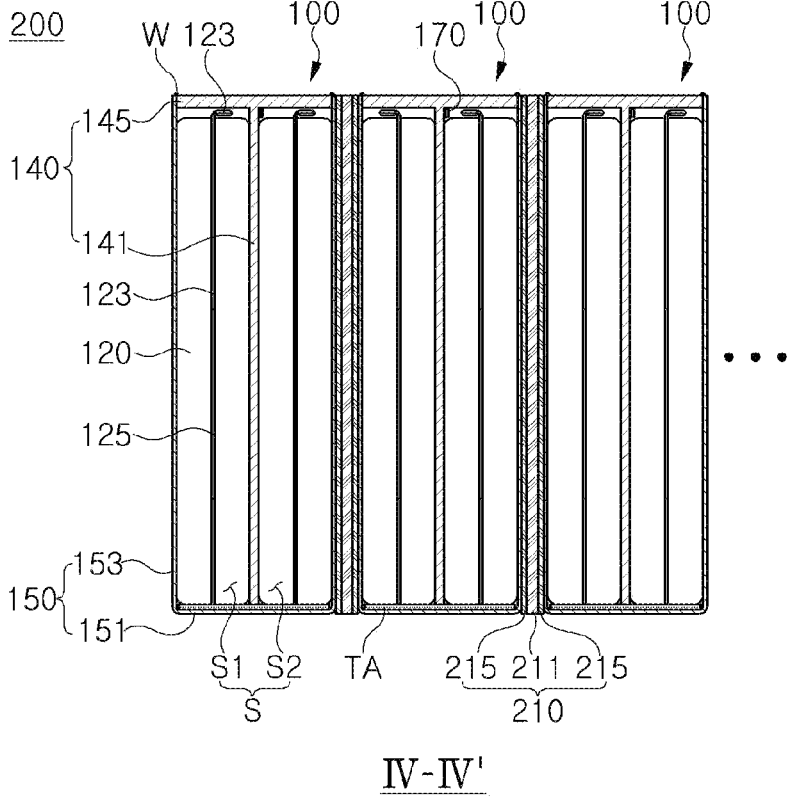
FIG. 16 is a cross-sectional diagram illustrating a modified example of the battery cell assembly illustrated in FIG. 15.

FIG. 16 is a cross-sectional diagram illustrating a modified example of the battery cell assembly 200 illustrated in FIG. 15. In the battery cell assembly 200 illustrated in FIG. 16, differently from the battery cell assembly 200 illustrated in FIG. 15, the configuration of the battery cell bundle 100 may be the same as the example in FIG. 15, and only the stack structure of the heat or flame spread blocking member 210 may be different. Accordingly, the configuration of the battery cell bundle 100 illustrated in FIG. 16 may be similar or identical to the configuration of the battery cell bundle 100 described with reference to FIGS. 1 to 12.

The heat or flame spread blocking member 210 in FIG. 16 may form a sandwich structure in which the heat insulating member 211 and the compression member 215 are stacked, and the compression member 215 may be attacked to both surfaces of the heat insulating member 211. That is, the heat insulating member 211 may be disposed between the compression members 215, and the compression member 215 may have a shape exposed externally. In this case, the compression member 215 may oppose the battery cell bundle 100. The compression member 215 may be fixed to the battery cell bundle 100 by an adhesive member (not illustrated) such as double-sided tape. The thickness of the insulating member 211 and the compression member 215 may be determined in consideration of heat resistance performance required for the battery cell assembly 200 and the swelling amount of the battery cell 120.

In FIGS. 15 and 16, the heat or flame spread blocking member 210 may have a three-layer sandwich laminated structure, but the heat insulating member 211 and the compression member 215 may form three or more layers in the heat or flame spread blocking member 210.

In an example embodiment, the heat or flame spread blocking member 210 is not limited to the above-described configuration, and the configuration may be varied as long as the heat insulating member 211 having heat insulation and heat resistance is included. For example, the heat or flame spread blocking member 210 may not necessarily include the compression member 215, and only the heat insulating member 211 may be used or the heat insulating member 211 may be used together with a member having different properties (e.g., thermal conductivity).

In an example embodiment, the heat or flame spread blocking member 210 may not have to be disposed between entireties of the battery cell bundles 100, and may not be disposed between a portion of the battery cell bundles 100. Also, only the compression member 215 may be disposed between a portion of the battery cell bundles 100 instead of the heat or flame spread blocking member 210.

Figures 17A, 17B:
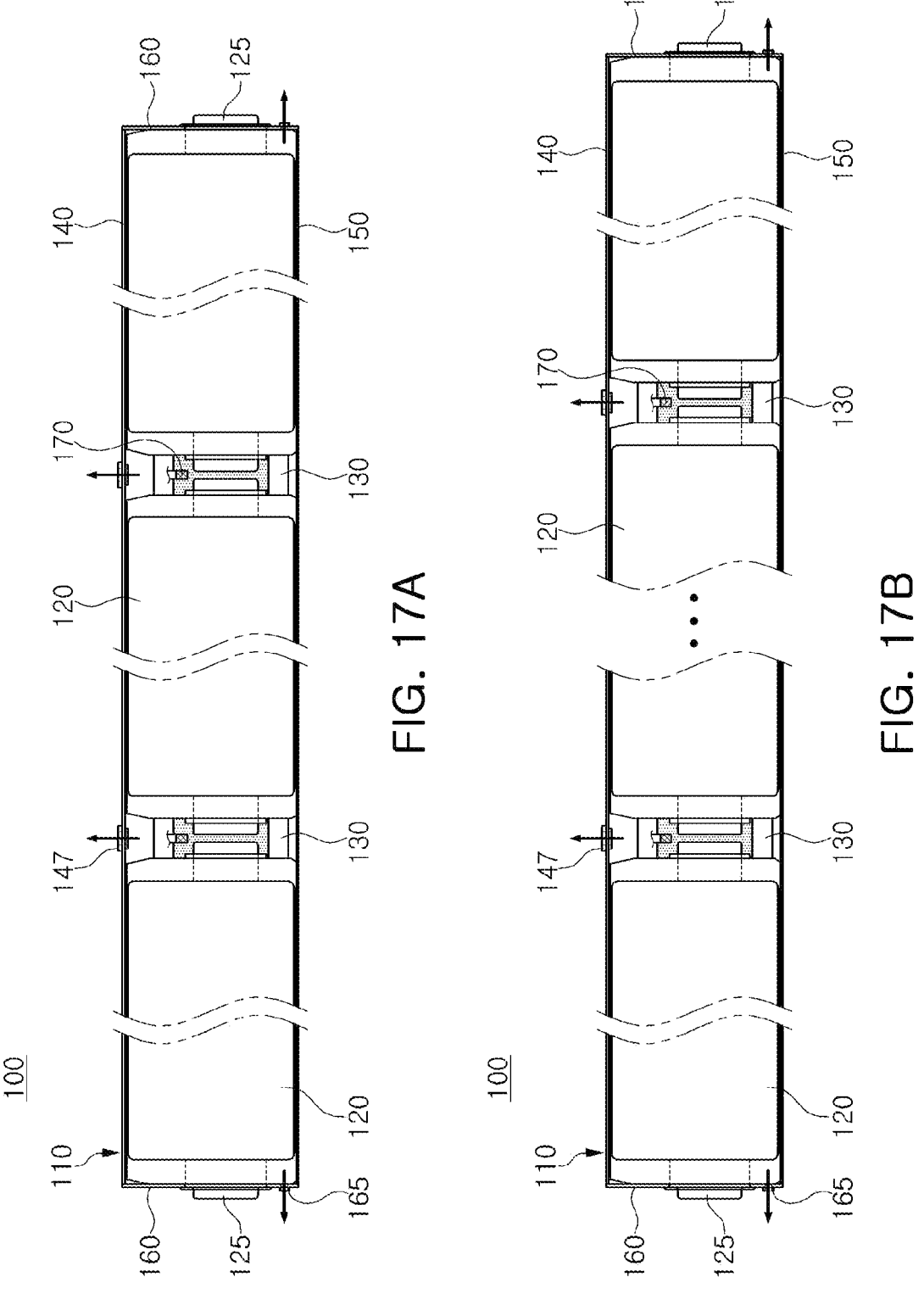
FIGS. 17A and 17B are diagrams illustrating a battery cell bundle in which the number of connected battery cells is modified.

FIGS. 17A and 17B are diagrams illustrating a battery cell bundle 100 in which the number of electrically connected battery cells 120 are modified.

FIG. 17A illustrates a shape in which three battery cells 120 are electrically connected by an internal busbar 130, and FIG. 17B illustrates the shape in which more than three battery cells 120 are electrically connected to each other by the internal busbar 130.

In an example embodiment, the battery cell assembly 200 may increase the number of the battery cells 120 in each battery cell bundle 100 to correspond to a space (e.g., pack housing) for the battery cell assembly 200 to be installed.

For example, when the length of the support member 140 and the cover member 150 and the number of internal busbars 130 are increased to correspond to the number of battery cells 120, the number of the battery cells 120 disposed in the battery cell bundle 100 may be increased to three or four or more. The structure in which the electrode leads 125 of the battery cells 120 on both ends of the support member 140 are discharged externally through the panel member 160 may be maintained the same. Also, the gas generated in the internal space of the battery cell bundle 100 may be discharged externally through the first venting member 147 provided in a portion corresponding to the internal busbar 130 of the support member 140 and a second venting member 165 provided in the panel member 160.

Figure 18:
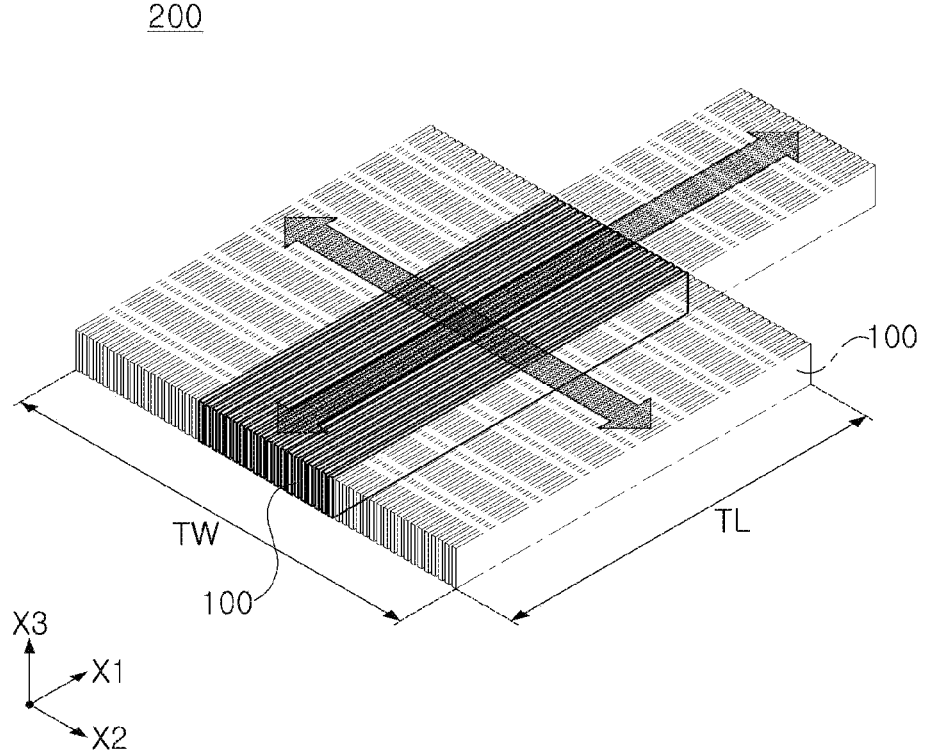
FIG. 18 is a diagram illustrating a modified structure of a battery cell assembly according to an example embodiment of the disclosed technology.

FIG. 18 is a diagram illustrating a modified structure of a battery cell assembly 200 according to an example embodiment.

As illustrated in FIGS. 15, 17A and 17B, in some example embodiments, the number of battery cells 120 provided in each battery cell bundle 100 may be increased or decreased, and the number of stacked battery cell bundles 100 may be increased or decreased.

Accordingly, the length of the battery cell bundle 100 and the number of stacked battery cell bundles 100 may be adjusted to correspond to the size of the space (e.g., the pack housing) in which the battery cell assembly 200 is installed.

For example, a total length TL and a total width TW of the battery cell assembly 200 may be adjusted to correspond to the size of the pack housing 410 (in FIG. 27) in which the battery cell assembly 200 is installed. In this case, the total length TL of the battery cell assembly 200 may be adjusted by increasing or decreasing the number of battery cells 120 provided in each battery cell bundle 100, and the total width TW of the battery cell assembly 200 may be adjusted through the number of the stacked battery cell bundles 100. Also, the length of the battery cell bundle 100 may be adjusted according to the length of the battery cells 120 included in the battery cell bundle 100.

As described above, in an example embodiment, since the width and length of the battery cell assembly 200 may be freely adjusted, extension of the width/length and various changes may be possible depending on the installation environment of the battery cell assembly 200.

In the description below, the battery module 300 according to an example embodiment will be described with reference to FIGS. 19 to 26.

Figure 19:
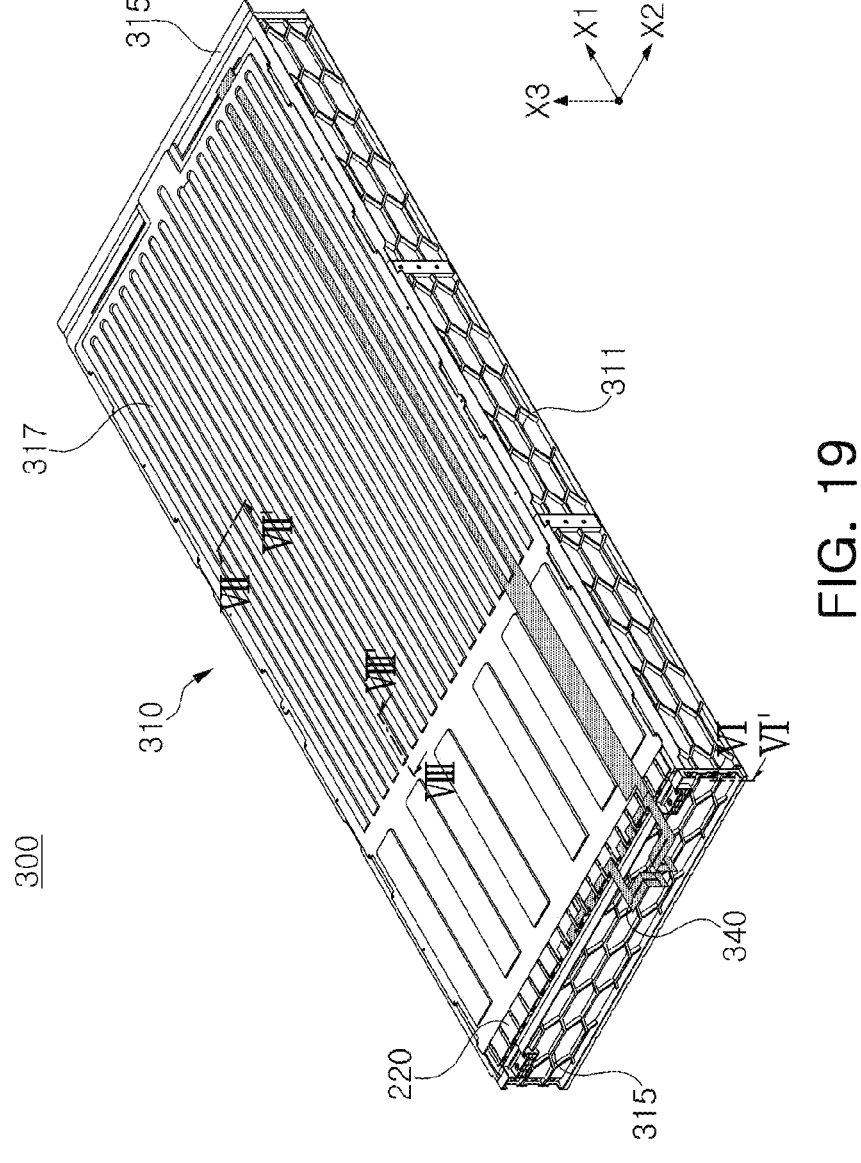
FIG. 19 is a perspective diagram illustrating a battery module according to an example embodiment of the disclosed technology.
Figure 20:
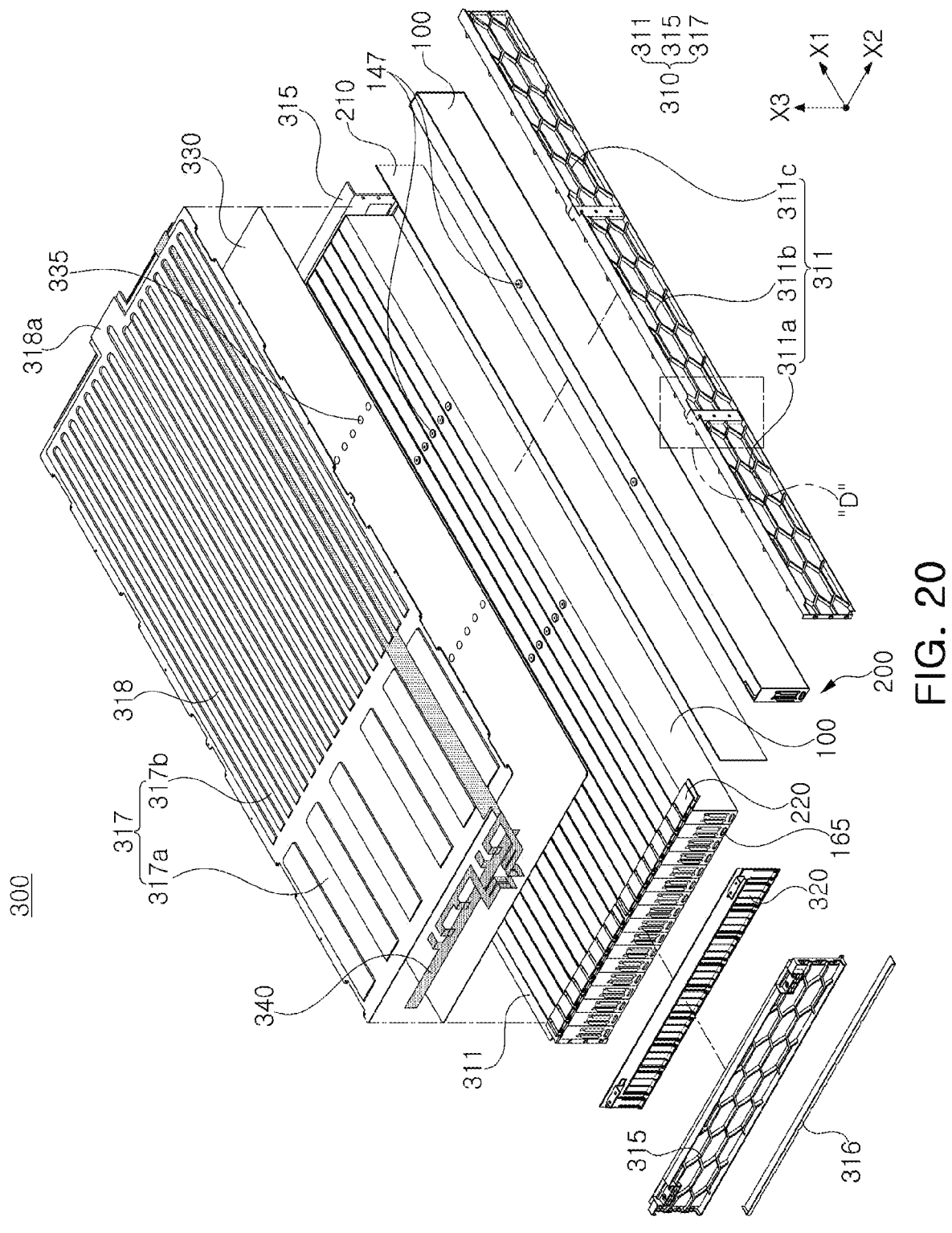
FIG. 20 is an exploded perspective diagram illustrating the battery module illustrated in FIG. 19.
Figure 21:
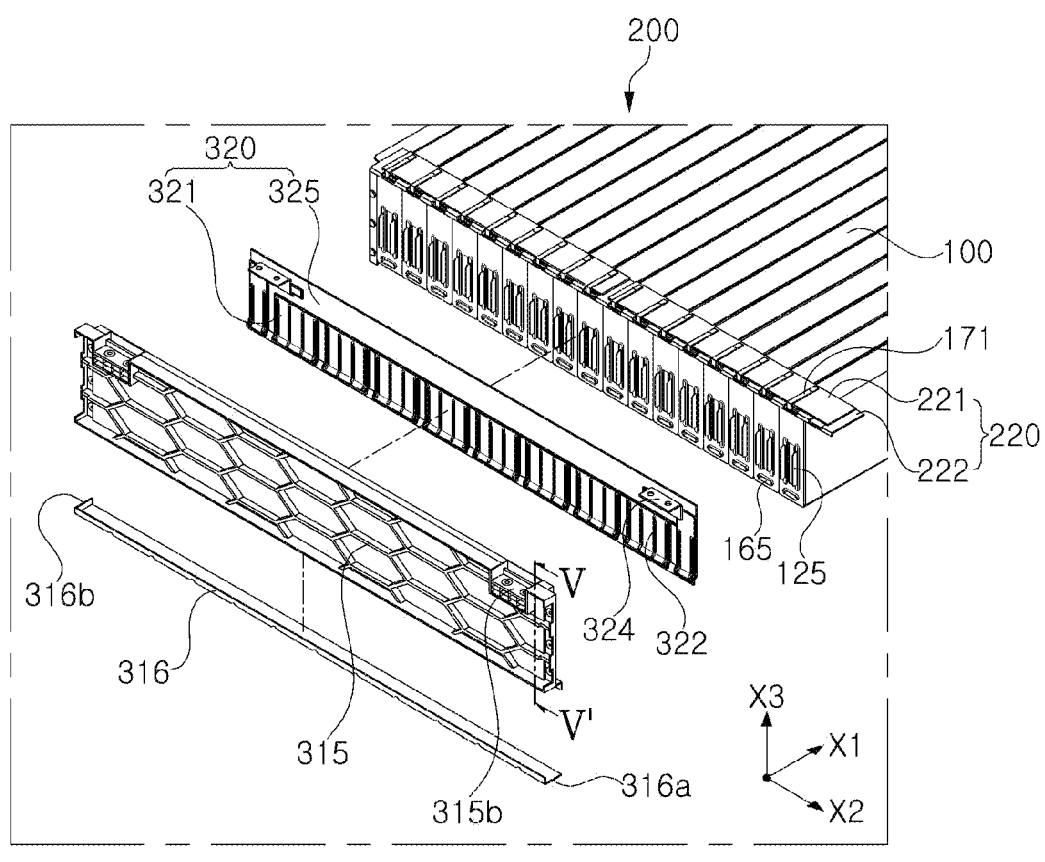
FIG. 21 is an enlarged perspective diagram illustrating the configurations of a battery cell assembly, a busbar assembly, an end plate, and a second guide member in FIG. 20.
Figure 22:
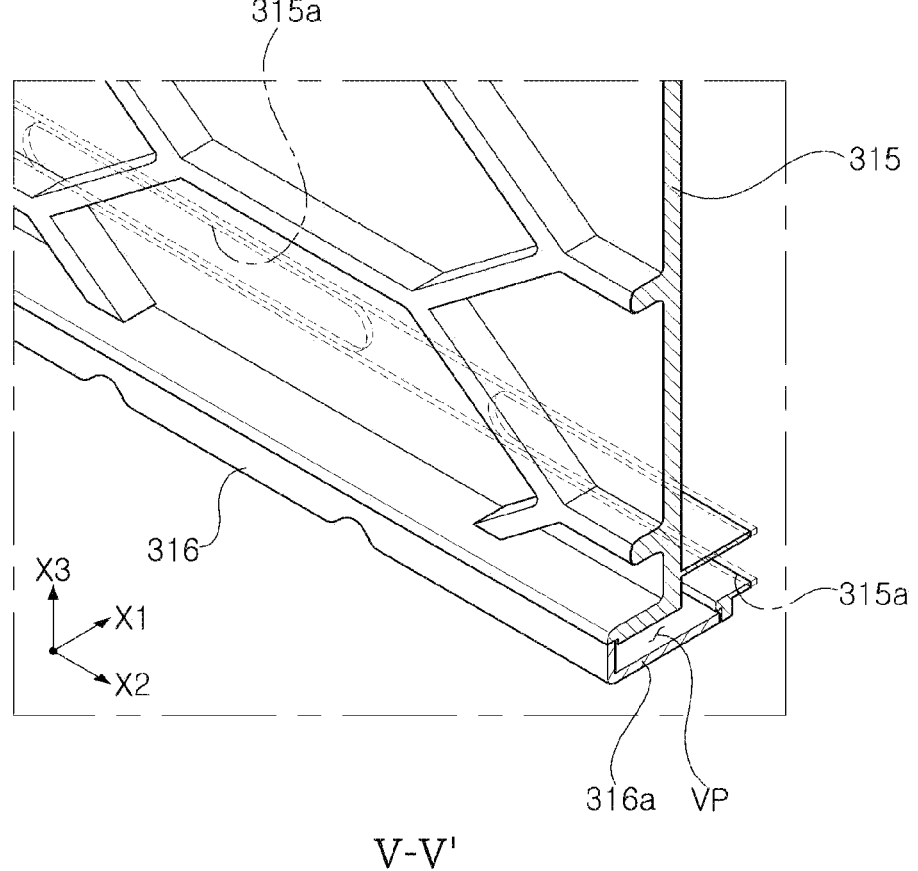
FIG. 22 is a cross-sectional diagram taken along line V-V' in FIG. 21.
Figure 23:
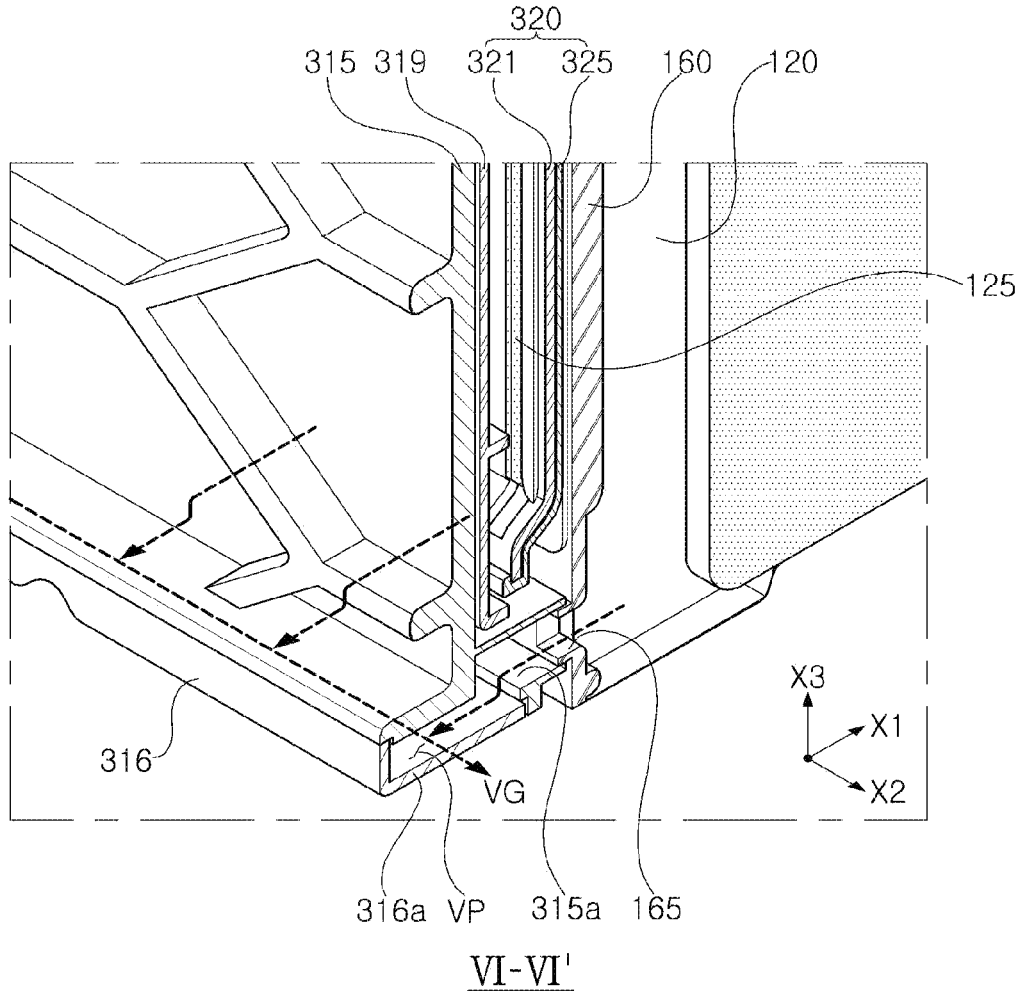
FIG. 23 is a cross-sectional diagram taken along line VI-VI' in FIG. 19.
Figure 24:
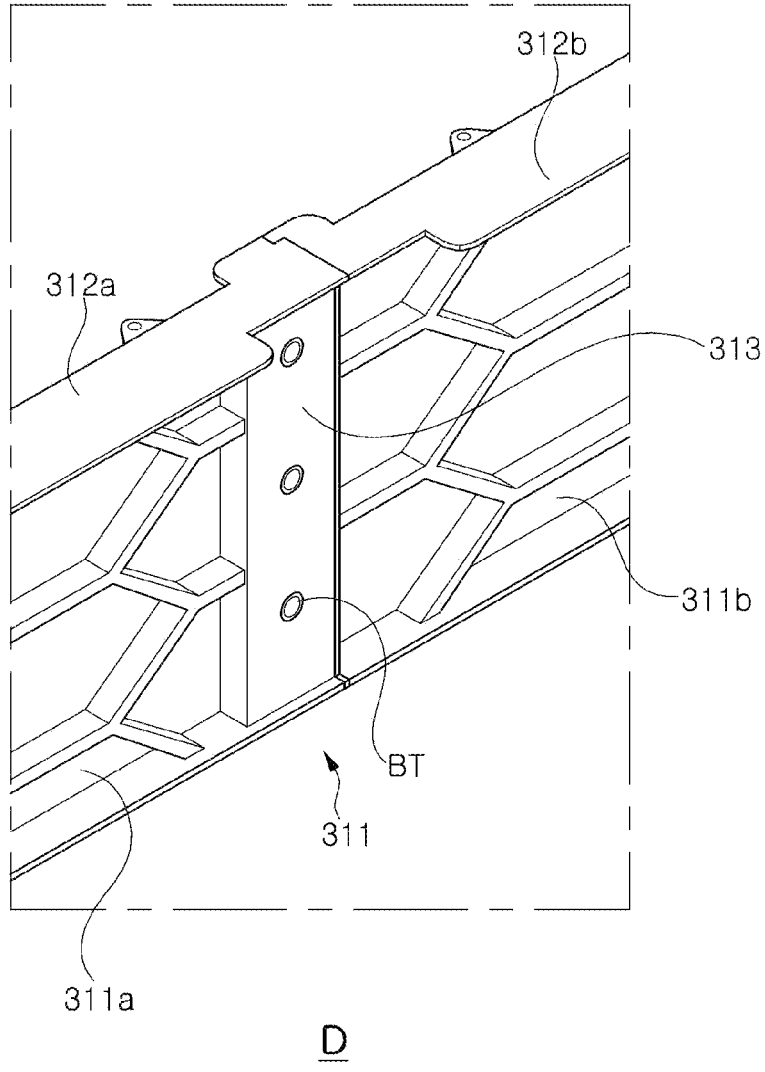
FIG. 24 is an enlarged perspective diagram illustrating portion "D" in FIG. 20.
Figure 25:
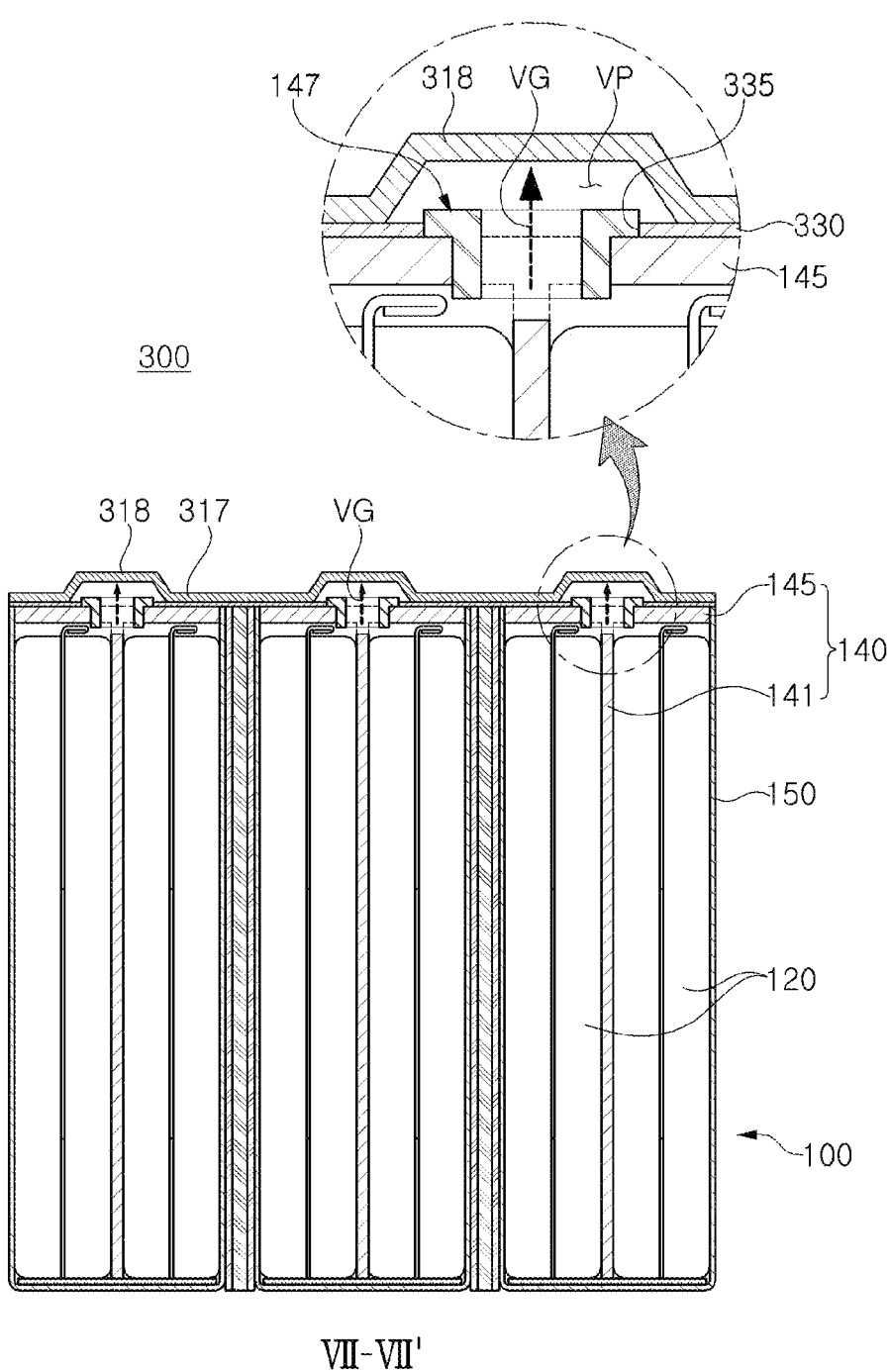
FIG. 25 is a cross-sectional diagram taken along line VII-VII' in FIG. 19.
Figure 26:
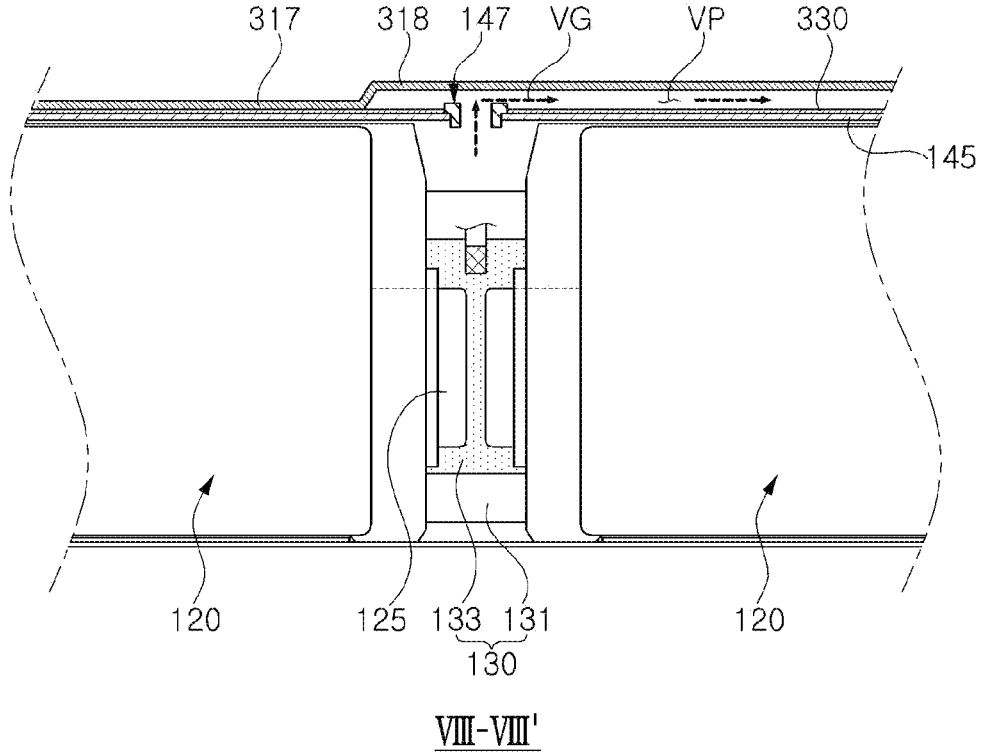
FIG. 26 is a cross-sectional diagram taken along line VIII-VIII' in FIG. 19.

FIG. 19 is a perspective diagram illustrating a battery module 300 according to an example embodiment. FIG. 20 is an exploded perspective diagram illustrating the battery module 300 illustrated in FIG. 19. FIG. 21 is an enlarged perspective diagram illustrating the configurations of a battery cell assembly 200, a busbar assembly 320, an end plate 315, and a second guide member 316 in FIG. 20. FIG. 22 is a cross-sectional diagram taken along line V-V' in FIG. 21. FIG. 23 is a cross-sectional diagram taken along line VI-VI' in FIG. 19. FIGS. 22 and 23 illustrate the state in which the end plate 315 and the second guide member 316 are coupled. FIG. 24 is an enlarged perspective diagram illustrating portion "D" in FIG. 20. FIG. 25 is a cross-sectional diagram taken along line VII-VII' in FIG. 19. FIG. 26 is a cross-sectional diagram taken along line VIII-VIII' in FIG. 19.

Referring to FIGS. 19 to 21, the battery module 300 according to an example embodiment may include a battery cell assembly 200 formed by stacking a plurality of battery units, a busbar assembly 320 electrically connected to the electrode lead 125 of the plurality of battery units, and a module housing 310 installed to oppose at least a portion of an external surface of the battery cell assembly 200 and the busbar assembly 320.

The battery unit included in the battery cell assembly 200 may be configured as a battery cell bundle 100 including a plurality of battery cells 120 as described with reference to FIGS. 1 to 12 as an example. However, in an example embodiment, the battery unit may include a single battery cell, or may include a plurality of battery cell bundles having a structure different from the example illustrated in FIGS. 1 to 12. Hereinafter, the battery cell bundle 100 in FIGS. 1 to 12 will be described as an example as a battery unit for ease of description. To avoid unnecessary overlap, the descriptions in the aforementioned example embodiment may be applied to a detailed description of the battery cell bundle 100 and only the components related to the battery module 300 will be described briefly.

The battery cell bundle 100 may include venting members 147 and 165 for discharging the gas generated in the battery cell bundle 100 externally of the battery cell bundle 100. The venting members 147 and 165 may include a first venting member 147 disposed on the upper surface of each battery cell bundle 100 and a second venting member 165 (see FIG. 2) disposed on both ends of each battery cell bundle 100.

As illustrated in FIGS. 14 to 17, the battery cell assembly 200 may include a plurality of battery cell bundles 100 and a heat or flame spread blocking member 210 disposed between at least a portion of the battery cell bundles 100. Also, the battery cell assembly 200 may include a circuit connection member 220 electrically connected to the circuit member 171 exposed externally of the battery cell bundle 100. The circuit connection member 220 may include a circuit portion 221 electrically connected to the circuit member 171 installed on each of the plurality of battery cell bundles 100, and an insulating support portion 222 insulating the battery cell bundle 100 and the circuit portion 221 from each other. In some implementations, the battery cell assembly 200 may be similar or identical to the battery cell assembly discussed above.

The module housing 310 may have a shape surrounding at least a portion of the external surface of the battery cell assembly 200. The module housing 310 may be installed to oppose at least a portion of the external surfaces of the battery cell assembly 200 and the busbar assembly 320.

Here, the module housing 310 may have a structure in which the bottom surface of the battery cell assembly 200 is exposed externally of the module housing 310. That is, the module housing 310 may have a structure surrounding five surfaces other than the bottom surface among six surfaces forming the external surface of the battery cell assembly 200.

For example, the module housing 310 may include two side plates 311 covering the side surfaces of the battery cell assembly 200, two end plates 315 disposed to cover the busbar assembly 320 in a portion in which the battery cell assembly 200 is coupled to the busbar assembly 320, and a module cover 317 covering the upper surface of the battery cell assembly 200.

The side plate 311 may stably support the battery cell assembly 200 by being mutually fastened to the end plate 315 and the module cover 317.

Also, the side plate 311 may be divided into a plurality of plates 311a, 311b, and 311c to correspond to changes in the length of the battery cell bundle 100. For example, when three battery cells 120 (in FIG. 2) are disposed in the length direction X1 of the battery cell bundle 100 in the battery cell bundle 100, the side plate 311 may be divided into three plates 311a, 311b, and 311c. Also, the number of plates may change according to the number of battery cells installed on the battery cell bundle 100. In this case, the length of the side plate 311 may easily change according to the change in the length of the battery cell bundle 100. However, the side plate 311 may be integrated as a single plate. Also, the side plate 311 may be divided into a number different from the number of battery cells installed on the battery cell bundle 100.

The module housing 310 may include discharge guide members 318 and 316 for guiding the gas discharged from the venting members 147 and 165 of the battery cell bundle 100 to flow in a predetermined direction. The discharge guide members 318 and 316 may include at least one of the first guide member 318 for guiding the flow of the gas discharged from the first venting member 147 and the second guide member 316 for guiding the flow of the gas discharged from the second venting member 165.

The first venting member 147 may be disposed in a portion of the battery cell bundle 100 opposing the module cover 317, and the first guide member 318 may be formed in a groove shape in the module cover 317 to be spatially connected to (or communicated with) the first venting member 147. Accordingly, the gas discharged from the first venting member 147 may flow along the groove-shaped venting path formed by the first guide member 318. The module cover 317 may include a first portion 317a in which the first guide member 318 is not formed and a second portion 317b in which the first guide member 318 is formed in the length direction X1 of the battery module 300.

The first guide member 318 may guide the gas discharged from the first venting member 147 in the first direction, that is, in the length direction X1 of the battery cell bundle 100.

Each of the battery cell bundles 100 may include a plurality of first venting members 147 on the upper surface. In this case, the first guide member 318 may have a shape extending in the length direction X1 of the battery cell bundle 100 to be connected to (or communicated with) each of the plurality of the first venting members 147.

In some implementations, each of the battery cell bundles 100 may include at least one first venting member 147. Also, the first guide member 318 may be provided in a number corresponding to the respective battery cell bundles 100. That is, the module cover 317 may include a plurality of first guide members 318 corresponding to the number of battery cell bundles 100.

The plurality of first guide members 318 may have a structure spatially connected to or communicated with each other on an end 318a of the module cover 317 in the length direction X1. In this case, the gas discharged from the battery cell bundle 100 through the first venting member 147 may flow in the length direction X1 of the battery cell bundle 100 through the first guide member 318 communicated with the respective first venting members 147 and may be discharged through the end 318a. The end 318a of the first guide member 318 may be disposed adjacent to a venting unit 427 (in FIG. 27) of the battery pack 400.

Since the first guide member 318 providing a path through which the gas discharged from the first venting member 147 flows may be formed in a groove shape in the module cover 317, the module cover 317 may be in contact with the high temperature gas. In consideration of this, the module cover 317 may be formed of a reinforcing material having heat resistance. As an example, the module cover 317 may be formed of a material including fiber reinforced plastics (FRP) having a light weight and high strength. Also, the module cover 317 may be formed of a material including glass fiber reinforced plastics (GFRP) and carbon fiber reinforced plastics (CFRP). However, the material of the module cover 317 is not limited thereto and may be varied, such that a metal material may be used.

To block the heat and/or flames generated in one of battery cell bundles 100 from spreading to the adjacent battery cell bundle 100 through the upper surface of the battery cell bundle 100, the blocking cover 330 for blocking the spread of heat and/or flames may be provided between the upper surface of the battery cell assembly 200 and the module cover 317. The blocking cover 300 may also block heat and/or flames generated by the battery cell bundle 100 from being transmitted directly to the module cover 317.

The blocking cover 330 may be formed of a heat-resistant material, and may be formed of a material including, for example, mica, ceramic wool, and the like. A through-hole 335 may be formed in the blocking cover 330 in a position corresponding to the first venting member 147.

The battery cell bundle 100 may include a second venting member 165 disposed on a portion opposing the end plate 315. The second venting member 165 may be disposed on each of both ends of the battery cell bundle 100. To specifically guide the gas discharged from the second venting member 165, the second guide member 316 may be installed in a position opposing the second venting member 165. The second guide member 316 may be connected to the end plate 315 and may guide the gas discharged from the second venting member 165 to flow in the second direction, which is the stacking direction X2 of the battery cell bundle 100. The second guide member 316 may extend in the direction X2 in which the battery cell bundles 100 are stacked and may have a shape in which at least one of both ends 316a and 316b is open. Also, the second guide member 316 may include an open end 316a on one side and a closed end 316b on the other side and may guide the gas discharged from the second venting member 165 toward the open end 316a.

The busbar assembly 320 may include at least one busbar 321 electrically connected to the electrode lead 125 of the plurality of battery cell bundles 100, and a support plate 325 having electrically insulating properties, which may insulate the busbar 321 while supporting the busbar 321. The busbar 321 may include a coupling hole 322 through which the electrode leads 125 exposed from the plurality of battery cell bundles 100 penetrate and is coupled thereto. The busbar 321 may be configured to connect the plurality of battery cell bundles 100 to each other in series/or parallel, and may be electrically connected to an external entity of the battery module 300 through a connection terminal 324.

Also, the battery module 300 may include a sensing module 340 for transferring a voltage signal and/or a temperature signal from the circuit connection member 220 connected to the circuit member 171 to the battery management system 440 (in FIG. 27). The sensing module 340 may have a shape extending in the length direction X1 of the battery module 300 to transmit signals on both ends taken in the length direction X1 of the battery module 300 to the battery management system 440 (in FIG. 27). The sensing module 340 may be configured as a flexible printed circuit board (FPCB), or may be configured as a printed circuit board (PCB).

Referring to FIG. 22, a venting path VP through which gas flows may be formed between the end plate 315 and the second guide member 316. A discharge hole 315a communicated with the second venting member 165 (in FIG. 23) may be formed in the end plate 315. The venting path VP may have a shape communicated with the discharge hole 315a of the end plate 315. The discharge hole 315a may be formed to correspond to the at least one second venting member 165. For example, the discharge hole 315a may have a shape and size to simultaneously surround the circumference of two or more second venting members 165. Accordingly, the gas discharged from the second venting member 165 may flow into the venting path VP through the discharge hole 315a without leaking to portions other than the discharge hole 315a. Differently from the above, the discharge hole 315a may have a shape and size surrounding the circumference of the second venting member 165.

Referring to FIG. 23, the electrode lead 125 of the battery cell 120 may be exposed externally of the panel member 160 and may be electrically connected to the busbar 321 of the busbar assembly 320. The gas VG discharged from the second venting member 165 provided in the panel member 160 may be discharged through the discharge hole 315a and may flow through the venting path VP formed between the end plate 315 and the second guide member 316. Since at least one side of the second guide member 316 is formed as an open end 316a, the gas VG flowing through the venting path VP may be discharged externally of the battery module 300 through the open end 316a.

In some implementations, the end plate 315 may be formed of a metal material, and an insulating plate 319 having electrically insulating properties may be disposed between the end plate 315 and the busbar 321 for insulation.

Referring to FIG. 24, the side plate 311 may be divided into a plurality of plates 311a and 311b. The plurality of plates 311a and 311b may be coupled to and overlap each other through an overlapping portion 313, and may be coupled to each other by a fastening member BT. Rigidity of the side plate 311 may be secured through the overlapping portion 313. Also, flanges 312a and 312b extending in a direction opposite to the direction opposing the battery cell assembly 100 may be disposed on the side plate 311.

Referring to FIG. 25, in the battery cell bundle 100, the battery cells 120 may be disposed on both sides of the barrier wall 141 with respect to the barrier wall 141 of the support member 140. The external surface of the battery cell 120 may have a structure covered by the support member 140 and the cover member 150. A first venting member 147 may be disposed on the external side wall 145 of the support member 140, and the gas VG generated by the battery cell 120 may be discharged to the venting path VP through the first venting member 147. A blocking cover 330 for blocking heat and/or flame spread may be disposed between the module cover 317 and the support member 140. A through-hole 335 corresponding to the size of the first venting member 147 may be formed in the blocking cover 330 such that the first venting member 147 may penetrate the blocking cover 330 and may be connected to (or communicated with) the venting path VP formed by the first guide member 318. Accordingly, the gas VG discharged from the first venting member 147 may be stably discharged through the venting path VP without leaking to portions other than the through-hole 335.

Also, the module cover 317 may include a plurality of first guide members 318 to correspond to the first venting members 147 included in the respective battery cell bundles 100. In this case, the plurality of first guide members 318 may have a shape partitioned from each other in the stacking direction of the battery cell bundle 100. Accordingly, the gas generated by one of the battery cell bundles 100 may have a smaller effect on the adjacent battery cell bundle 100, such that the thermal runaway phenomenon may be delayed.

Referring to FIG. 26, the battery cell bundle 100 may include a first venting member 147 in a portion in which the electrode leads 125 of the plurality of battery cells 120 are connected to each other by the internal busbar 130. The gas VG discharged from the first venting member 147 may be discharged along the venting path VP formed between the first guide member 318 and the blocking cover 330.

In the description below, a battery pack 400 according to an example embodiment will be described with reference to FIGS. 27 to 30.

Figure 28:
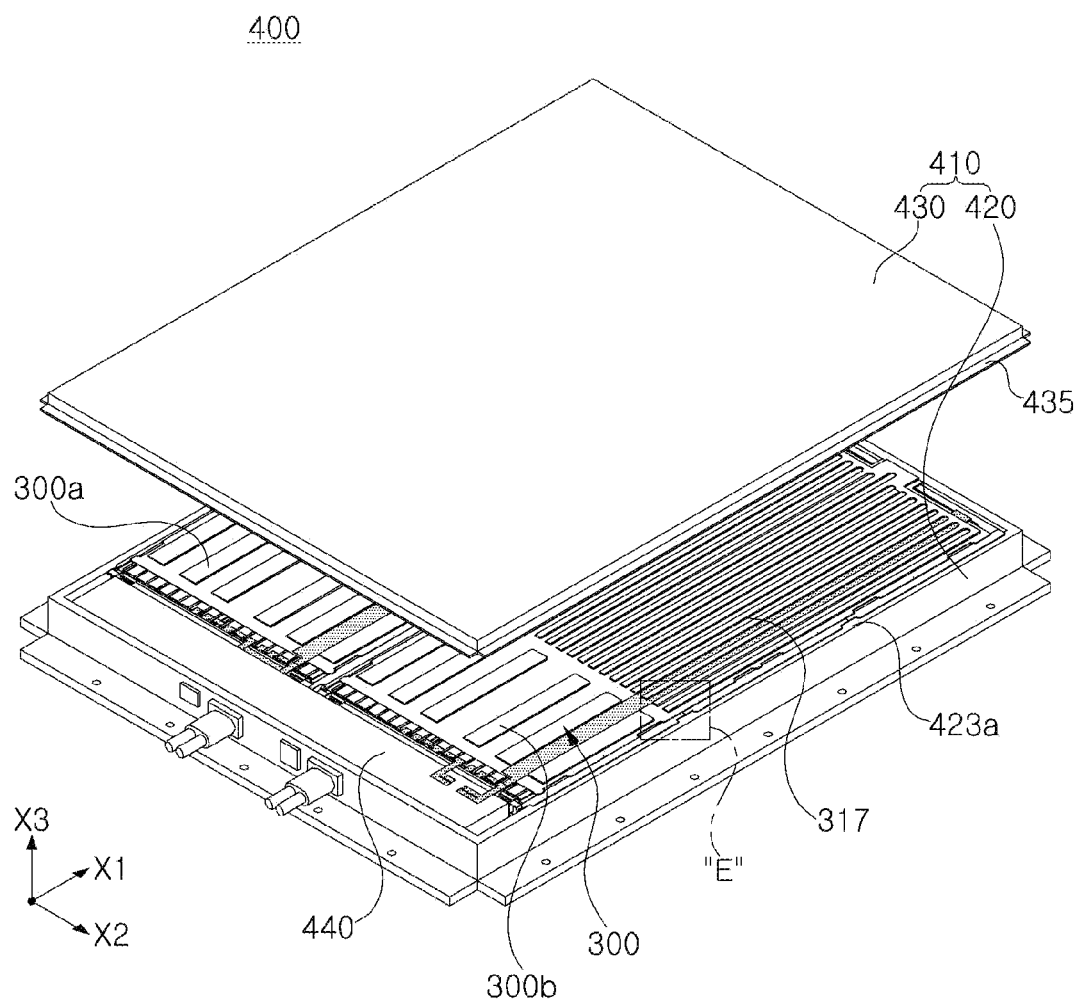
FIG. 28 is a perspective diagram illustrating a state in which a battery module is mounted on a pack housing with respect to the battery pack illustrated in FIG. 27.
Figure 29:
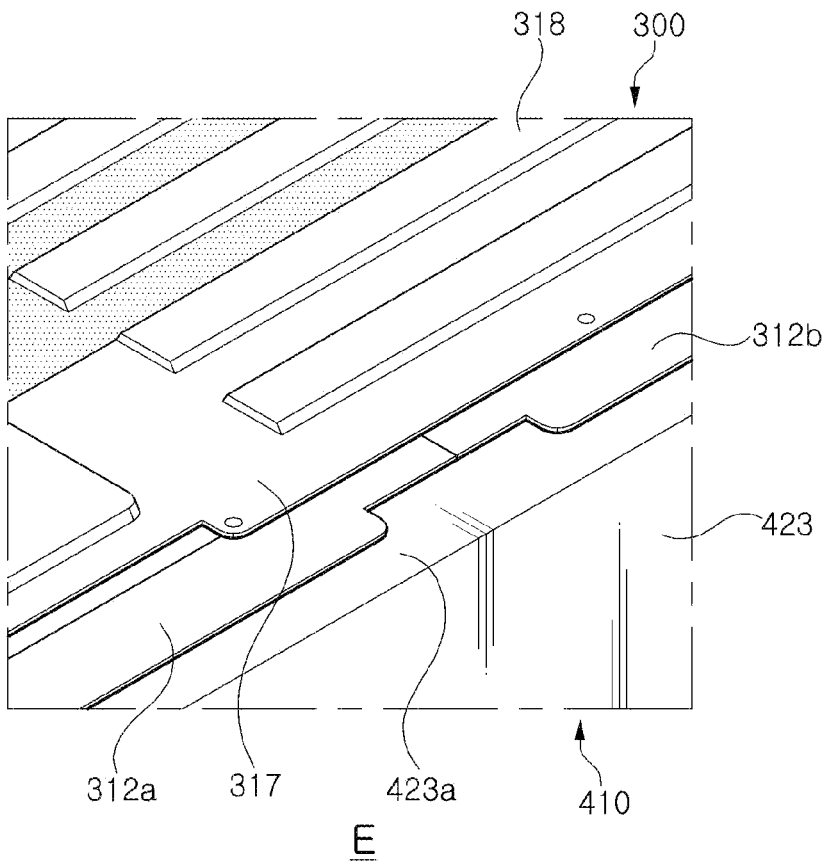
FIG. 29 is an enlarged perspective diagram illustrating portion "E" in FIG. 28.
Figure 30:
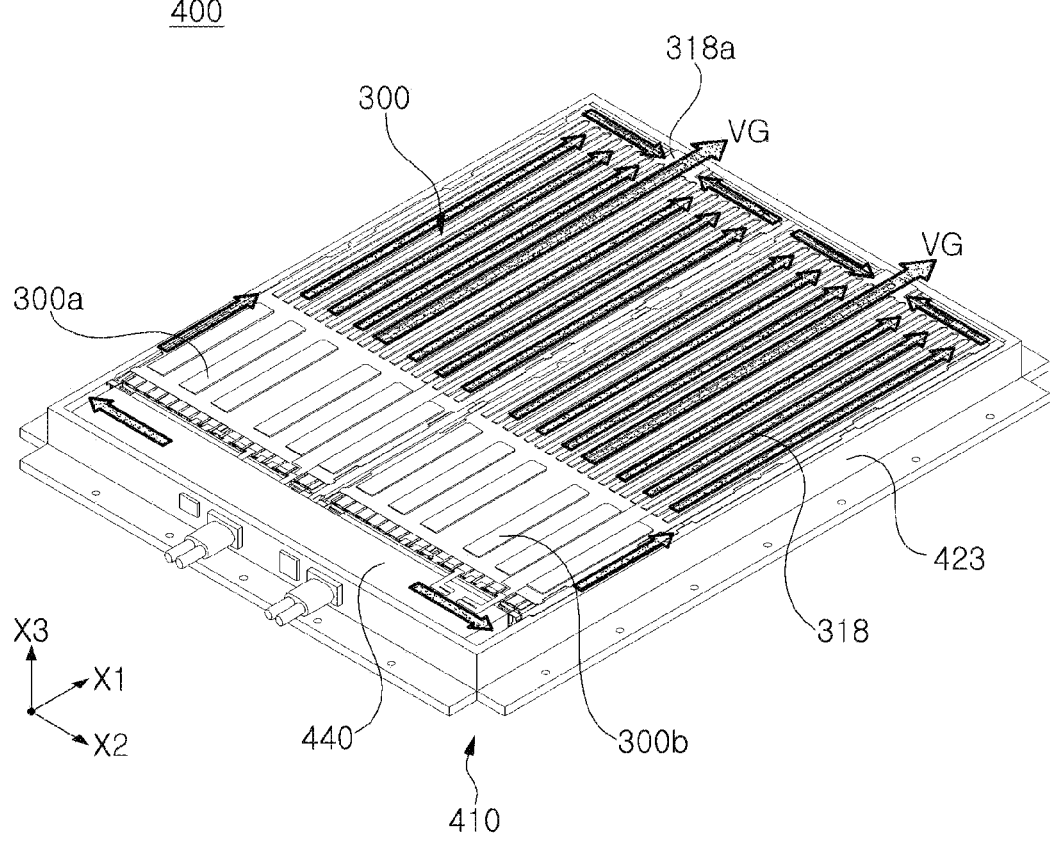
FIG. 30 is a diagram illustrating a flow of gas in a battery pack according to an example embodiment of the disclosed technology.

FIG. 27 is an exploded perspective diagram illustrating a battery pack 400 according to an example embodiment. FIG. 28 is a perspective diagram illustrating a state in which a plurality of battery modules 300 are mounted on a pack housing 410 with respect to the battery pack 400 illustrated in FIG. 27. FIG. 29 is an enlarged perspective diagram illustrating portion "E" in FIG. 28. FIG. 30 is a diagram illustrating a flow of gas VG in a battery pack 400 according to an example embodiment.

As illustrated in FIGS. 27 and 28, the battery pack 400 may include a pack housing 410 in which an accommodating space 425 is formed, and the plurality of battery modules 300 accommodated in the accommodating space 425 of the pack housing 410.

The pack housing 410 may include a housing body 420 forming an accommodating space 425, and a housing cover 430 coupled to the upper portion of the housing body 420 and covering the accommodating space 425. The housing body 420 may include a bottom portion 421 and a sidewall portion 423 extending upwardly from an edge of the bottom portion 421. The bottom portion 421 and the four side wall portions 423 may form an accommodating space 425 having a predetermined size. The pack housing 410 may include a venting unit 427 for discharging the gas generated in the accommodation space 425 externally.

In an example embodiment, the battery module 300 described with reference to FIGS. 19 to 26 may be similar or identical to the battery module 300 in the pack housing 410 discussed above.

The main components of the battery module 300 will be schematically described with reference to FIGS. 19 to 26. The battery module 300 may include a battery cell assembly 200 formed by stacking a plurality of battery cell bundles (battery units) 100. Also, the battery module 300 may include a module housing 310 installed to oppose at least a portion of the external surfaces of the battery cell assembly 200. The module housing 310 may have a structure in which the bottom surface of the battery cell assembly 200 is exposed externally of the module housing 310. For example, the module housing 310 may include two side plates 311 covering the side surfaces of the battery cell assembly 200, two end plates 3115 disposed to cover the busbar assembly 320 in a portion in which the battery cell assembly 200 is coupled to the busbar assembly 320, and a module cover 317 covering the upper surface of the battery cell assembly 200.

In some implementations, the first venting member 147 of the battery cell bundle (battery unit) 100 may be installed on a portion opposing the module cover 317, and the first guide member 318 having a groove shape drawn in an upward direction to be connected to or communicated with the first venting member 147 may be disposed in the module cover 317.

The second venting member 165 of the battery cell bundle (battery unit) 100 may be disposed on both ends of the battery cell assembly 200, and the discharge hole 315a connected to the second venting member 165 may be formed in the end plate 315. A second guide member 316 may be coupled to the end plate 315. The second guide member 316 may form a venting path VP between the second guide member 316 and the end plate 315 to guide the gas VG discharged through the second venting member 165 and the discharge hole 315a.

Also, the battery pack 400 may further include a battery management system (BMS) 440. The battery management system 440 may receive a voltage signal and/or a temperature signal, received through a circuit member 171 (in FIG. 21), a circuit connection member 220 (in FIG. 21), and a sensing module 340 (in FIG. 20) and may monitor and manage a voltage state and/or a temperature state of a battery cell provided in the battery module 300. The battery management system 440 may include a battery energy control module (BECM).

Referring to FIGS. 27 and 28 together with FIG. 20, the battery module 300 may be installed on the bottom portion 421 of the pack housing 410 in a state in which the bottom surface of the battery cell assembly 200 is exposed externally of the module housing 310, heat generated in the battery cell assembly 200 may be rapidly discharged externally through the pack housing 410. For heat dissipation of the battery pack 400, a cooling member (not illustrated) for cooling the pack housing 410 may be disposed on the bottom portion 421 or the lower portion of the bottom portion 421 of the pack housing 410. The bottom surface of the battery cell assembly 200 may be in direct contact with the bottom portion 421 of the pack housing 410 or may be thermally in contact with the bottom portion 421 through a heat transfer member applied/attached to the upper surface of the bottom portion 421 (e.g., a thermally conductive adhesive member) (not illustrated). As described above, since the bottom surface of the battery cell assembly 200 is seated on the bottom portion 421 of the pack housing 410 in an exposed state, the cooling efficiency of the battery module 300 and/or the battery pack 400 may improve.

Referring to FIG. 29 together with FIG. 24, the side plate 311 may be divided into a plurality of plates 311a and 311b, and the side plate 311 may include flanges 312a and 312b extending toward the side wall portion 423. Since the side plate 311 may be fixed to the side wall portion 423 in a state in which the flanges 312a and 312b are supported by the support surface 423a of the side wall portion 423, the battery module 300 may be firmly supported by the pack housing 410. Also, a portion of the edge of the module cover 317 and/or the flange portion 435 (in FIG. 28) of the housing cover 430 (in FIG. 28) may be supported by the support surface 423a of the side wall portion 423. Accordingly, at least a portion of the side plate 311, the module cover 317, and the housing cover 430 may be fastened together by being supported by the support surface 423a of the side wall portion 423. Accordingly, the battery module 300 may maintain a stable and strong fastening state in the installation space 425 of the pack housing 410 and may sufficiently withstand external impacts.

Referring to FIGS. 26 and 30, the gas VG discharged through the first venting member 147 may flow in the direction marked by an arrow through the first guide member 318 and may be discharged externally of the pack housing 410 through the venting unit 427 (in FIG. 27). That is, the first guide member 318 may guide the gas discharged from the first venting member 147 toward the venting unit 427.

Also, referring to FIGS. 23 and 30 together, the gas discharged through the second venting member 165 may pass through the discharge hole 315a and the venting path VP and may be discharged externally of the battery module 300 through the open end 316a of the second guide member 316. In this case, the battery module 300a disposed on one side of the battery pack 400 may allow the open end 316a of the second guide member 316 to be disposed adjacent to the sidewall portion 423 on one side, and the battery module 300b provided on the other side of the battery pack 400 may allow the open end 316a of the second guide member 316 to be disposed adjacent to the side wall portion 423 on the other side. Accordingly, the gas discharged through the open end 316a of the second guide member 316 in each of the battery modules 300a and 300b may be discharged toward the side wall portion 423 adjacent to each open end 316a. The gas discharged from the open end 316a may flow in the length direction X1 of the battery module 300 through the space between the side wall portion 423 and the battery modules 300a and 300b, and may be discharged externally of the pack housing 410 through the venting unit 427 (in FIG. 27). In some implementations, a flow path space through which the venting gas may flow may be formed in the side wall portion 423, and in this case, the gas discharged from the open end portion 316a may flow through the flow path space of the side wall portion 423 through an opening (not illustrated) formed in the side wall portion 423 and may be discharged externally of the pack housing 410 through the venting unit 427 (in FIG. 27).

According to the aforementioned example embodiments, the series and parallel connection structure between the battery cells may be simplified, and the electrical connectivity between the electrode lead and the internal busbar may be easily performed.

The disclosed technology may be implemented in ways to provide one or more advantages: (1) the fixing structure of the internal busbar may be simplified and stable; (2) the effect of delaying or reducing the thermal runaway phenomenon may be obtained; (3) by accommodating the plurality of battery cells in the internal space of the battery cell bundle, the gas generated in the battery cell bundle may have a smaller effect on the adjacent battery cell bundle; (4) the gas generated by the battery cells accommodated in the internal space may be discharged in a specific direction or position, and accordingly, the flow of the discharged gas may be easily controlled; (5) the battery cell bundle may be easily manufactured; or (6) the cooling efficiency may improve.

Only a few implementations and examples are described and other implementations, enhancements and variations can be made based on what is described and illustrated in this patent document.

What is claimed is:

1. A battery cell bundle, comprising:
a support member including a barrier wall including first and second sides extending from an end of the support member;
a plurality of first battery cells disposed along the support member on the first side of the barrier wall and a plurality of second battery cells disposed along the support member on the second side of the barrier wall, each of the plurality of first battery cells and the plurality of second battery cells being a pouch-type secondary battery that includes a pouch providing an internal space, an electrode assembly accommodated in the internal space of the pouch, and an electrode lead exposed externally of a sealing portion of the pouch; and
an internal busbar to electrically connect the plurality of battery cells to each other,
wherein the internal busbar includes a first busbar to electrically connect the electrode lead of the plurality of first battery cells disposed on the first side of the barrier wall to each other, and a second busbar to electrically connect the electrode lead of the plurality of second battery cells disposed on the second side of the barrier wall to each other, and
wherein a portion of the first busbar is electrically connected to a portion of the second busbar.

2. The battery cell bundle of claim 1, wherein the portion of the first busbar is electrically connected to the portion of the second busbar through a conductive material layer formed by penetrating through the barrier wall.

3. The battery cell bundle of claim 1,
wherein the first busbar is fixed to and installed on the first side of the barrier wall, and
wherein the second busbar is fixed to and installed on the second side of the barrier wall.

4. The battery cell bundle of claim 3,
wherein the first busbar and the second busbar are fastened to the barrier wall by a fastening portion, and
wherein the fastening portion fastens the first busbar and the second busbar together.

5. The battery cell bundle of claim 1,
wherein the first busbar includes a first insulating body formed of an insulating material, and a first conductive member supported by the first insulating body and formed of an electrically conductive material for electrically connecting the plurality of battery cells to each other,
wherein the second busbar includes a second insulating body formed of an insulating material, and a second conductive member supported by the second insulating body and formed of an electrically conductive material for electrically connecting the plurality of battery cells to each other, and
wherein the barrier wall includes an opening to connect the first conductive member to the second conductive member through the opening.

6. The battery cell bundle of claim 5,
wherein each of the first conductive member and the second conductive member includes a first conductive portion connected to one battery cell and a second conductive portion connected to another battery cell, respectively, and
wherein the first conductive portion is insulated from the barrier wall by the first insulating body or the second insulating body.

7. The battery cell bundle of claim 6, wherein the second conductive portion is connected to a different second conductive portion through the opening.

8. The battery cell bundle of claim 5, further comprising:
a sensing unit configured to measure an electrical state of the battery cell,
wherein the sensing unit includes a voltage sensing terminal connected to at least one of the first conductive member and the second conductive member, and a circuit member configured to transmit a signal from the voltage sensing terminal.

9. The battery cell bundle of claim 1, wherein a distance between the barrier wall and the electrode lead has a value of 0.95 to 1.05 times a distance between the barrier wall and a portion of the sealing portion from which the electrode lead is exposed.

10. The battery cell bundle of claim 1, wherein a portion of the electrode lead in contact with the internal busbar is disposed on the same plane on which the sealing portion is disposed.

11. The battery cell bundle of claim 1, wherein the electrode lead and the internal busbar are in surface-contact with each other and are electrically connected to each other.

12. The battery cell bundle of claim 1, further comprising:
a cover member surrounding at least a portion of an external surface of the plurality of first and second battery cells, and coupled to the support member such that the cover member and the support member define an internal space for accommodating the plurality of first and second battery cells; and
a panel member covering ends of the internal space,
wherein the internal space is divided into a plurality of installation spaces by the barrier wall, and
wherein the plurality of first and second battery cells are disposed in each of the installation spaces in the length direction of the barrier wall.

13. The battery cell bundle of claim 12, wherein the support member further includes an external side wall extending from at least one end of the barrier wall in a thickness direction of the battery cell.

14. A battery cell assembly, comprising:
a plurality of battery cell bundles to accommodate a plurality of battery cells in the plurality of battery cell bundles; and a blocking member disposed between at least a portion of adjacent battery cell bundles to block heat or flames generated in one of the battery cell bundles from spreading to an adjacent battery cell bundle, wherein each of the battery cell bundles includes:

a support member including a barrier wall including first and second sides extending from an end of the support member;

a plurality of first battery cells disposed along the support member on the first side of the barrier wall and a plurality of second battery cells disposed along the support member on the second side of the barrier wall, each of the plurality of first battery cells and the plurality of second battery cells and being a pouch-type secondary battery that includes a pouch providing an internal space, an electrode assembly accommodated in the internal space of the pouch and an electrode lead exposed externally of a sealing portion of the pouch; and an internal busbar to electrically connect the plurality of the battery cells to each other, wherein the internal busbar includes a first busbar to electrically connect the electrode leads of the plurality of first battery cells disposed on the first side of the barrier wall to each other, and a second busbar to electrically connect the electrode leads of the plurality of second battery cells disposed on the second side of the barrier wall to each other, and wherein a portion of the first busbar is electrically connected to a portion of the second busbar through the barrier wall.

15. The battery cell assembly of claim 14, wherein the portion of the first busbar is electrically connected to the portion of the second busbar through a conductive material layer formed by penetrating through the barrier wall.

16. The battery cell assembly of claim 14, wherein the first busbar is fixed to and installed on the first side of the barrier wall, and wherein the second busbar is fixed to and installed on the second side of the barrier wall.

17. The battery cell assembly of claim 16, wherein the first busbar and the second busbar are fastened to the barrier wall by a fastening portion, and wherein the fastening portion fastens the first busbar and the second busbar together.

18. The battery cell assembly of claim 14, wherein the first busbar includes a first insulating body formed of an insulating material, and a first conductive member supported by the first insulating body and formed of an electrically conductive material for electrically connecting the plurality of battery cells to each other, wherein the second busbar includes a second insulating body formed of an insulating material, and a second conductive member supported by the second insulating body and formed of an electrically conductive material for electrically connecting the plurality of battery cells to each other, and wherein the barrier wall includes an opening to connect the first conductive member to the second conductive member through the opening.

19. The battery cell assembly of claim 18, wherein each of the first conductive member and the second conductive member includes a first conductive portion connected to one battery cell and a second conductive portion connected to another battery cell, respectively, and wherein the first conductive portion is insulated from the barrier wall by the first insulating body or the second insulating body.

* * * * *